May 21, 1940.  B. ROTTENBERG  2,201,872
CUTTING, SHAPING, EMBOSSING, AND WRAPPING MACHINE FOR
BUTTER OR SIMILAR PLASTIC MATERIAL
Filed April 2, 1937   16 Sheets-Sheet 1

WITNESSES
Chris Peinle
A. L. Kitchin

INVENTOR
Benjamin Rottenberg.
BY
Munn, Anderson & Liddy
ATTORNEYS.

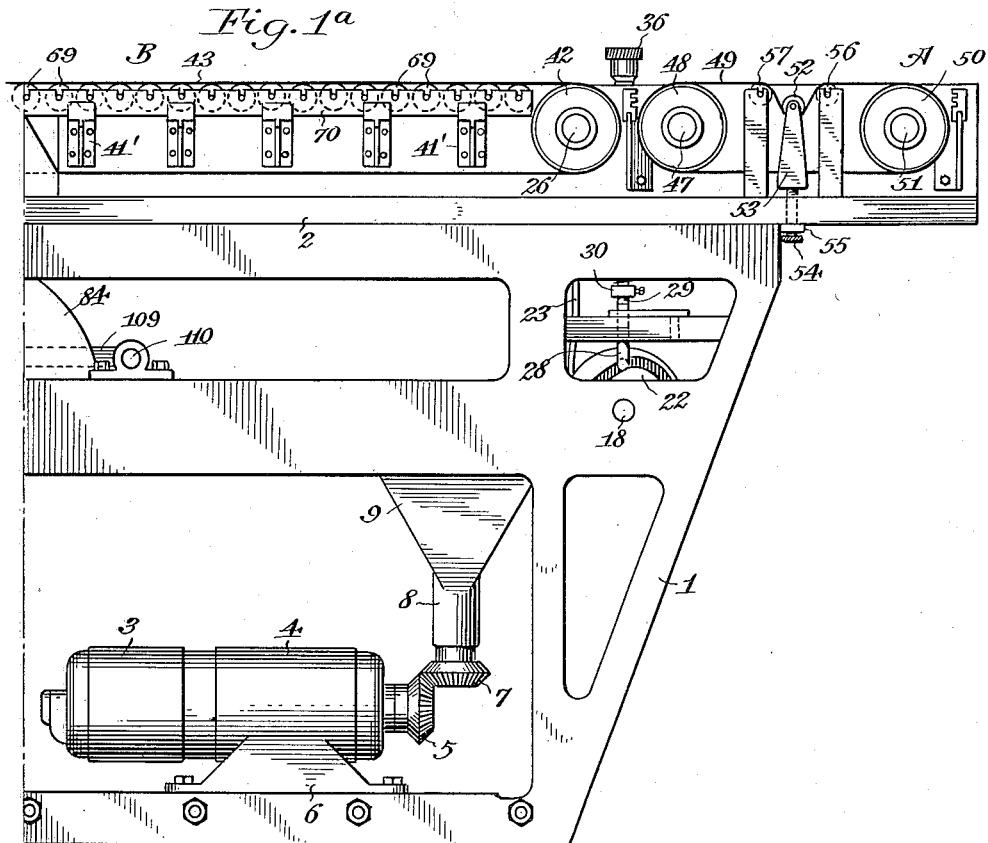
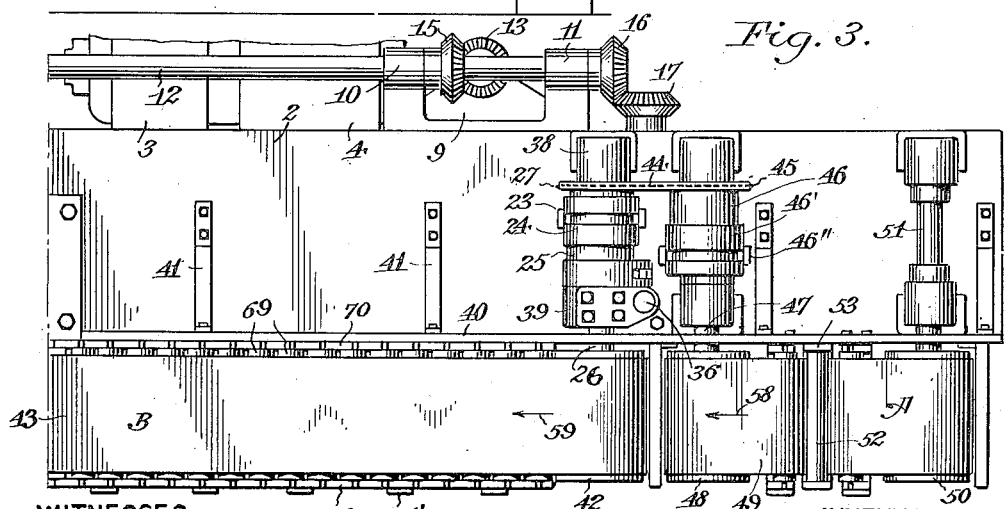

May 21, 1940.     B. ROTTENBERG     2,201,872
CUTTING, SHAPING, EMBOSSING, AND WRAPPING MACHINE FOR
BUTTER OR SIMILAR PLASTIC MATERIAL
Filed April 2, 1937     16 Sheets-Sheet 3

WITNESSES
Chris Feinle
A. L. Kitchin

INVENTOR
Benjamin Rottenberg
BY
Munn, Anderson & Leddy
ATTORNEYS

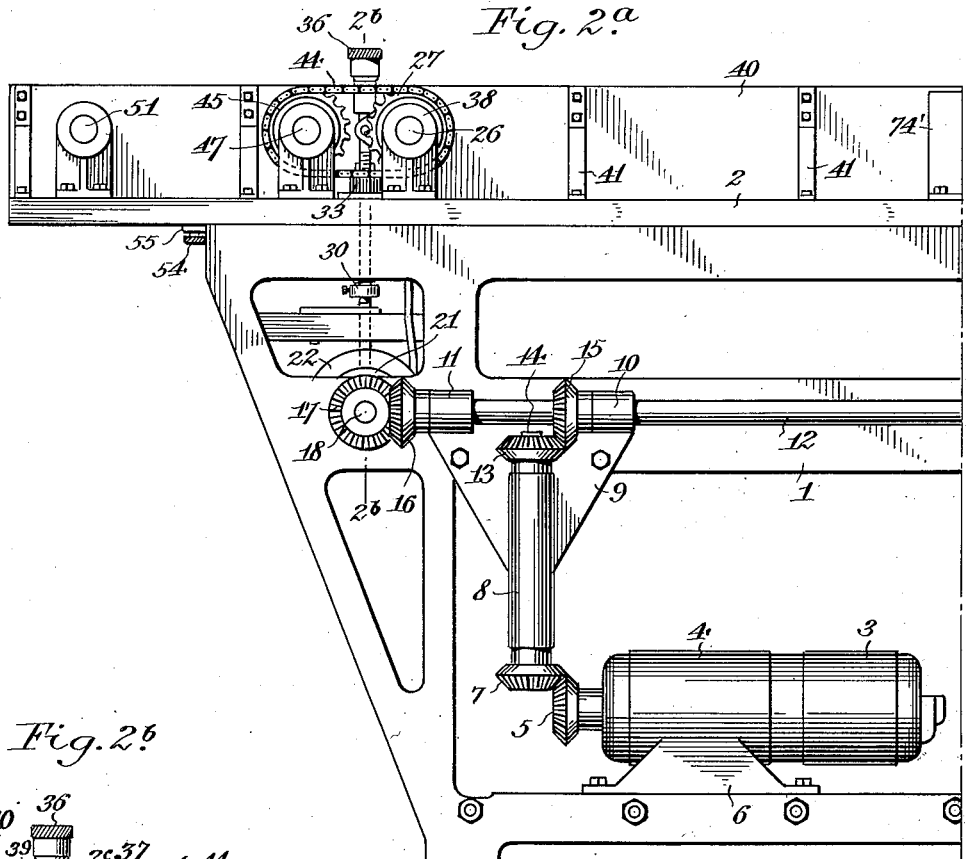
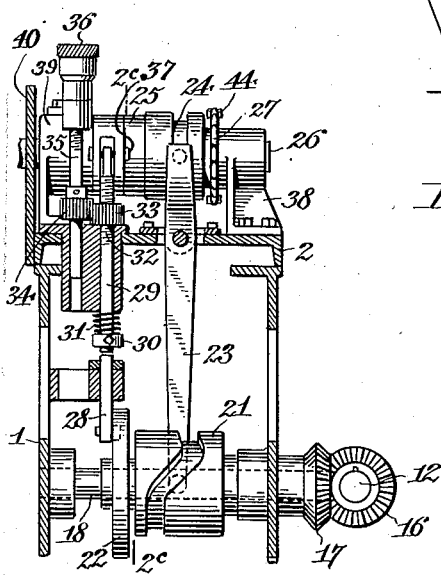
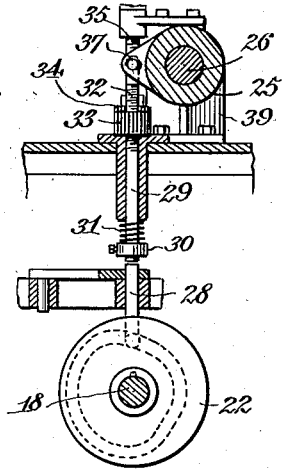

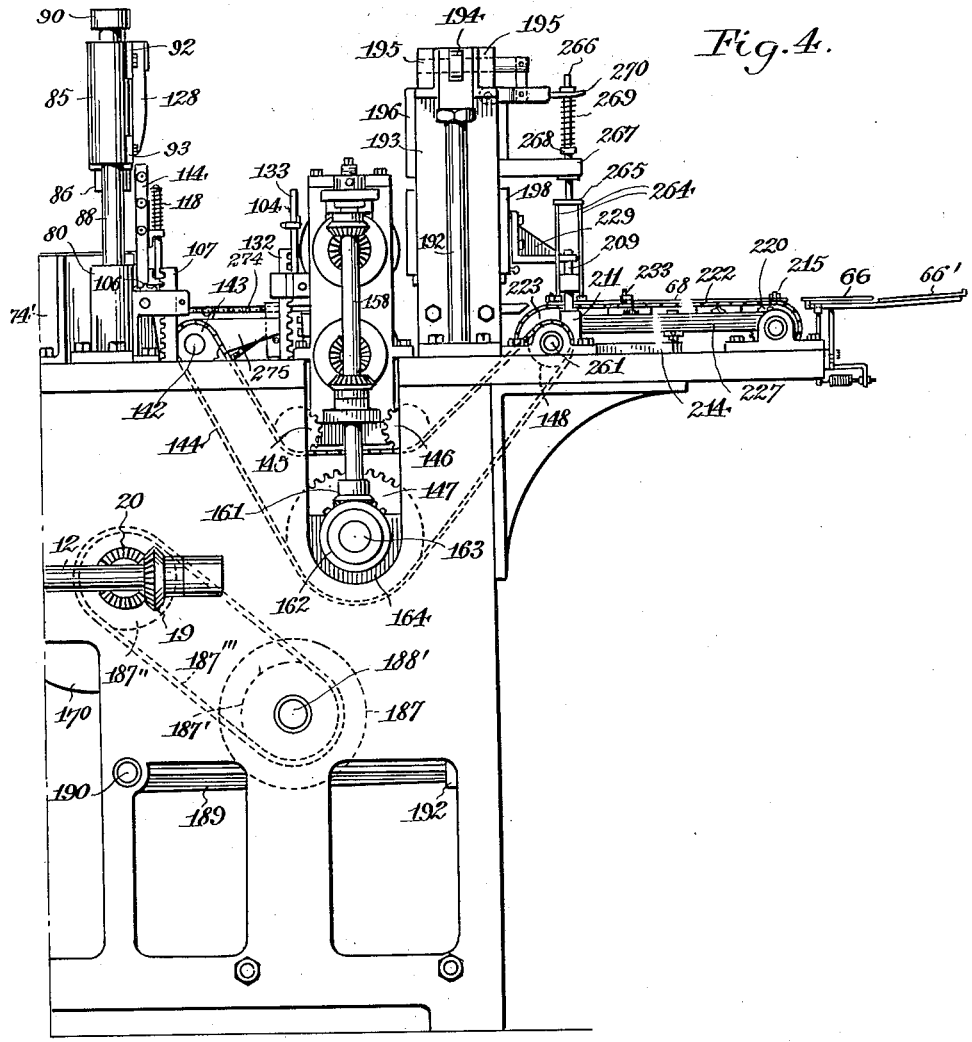
Fig. 4.
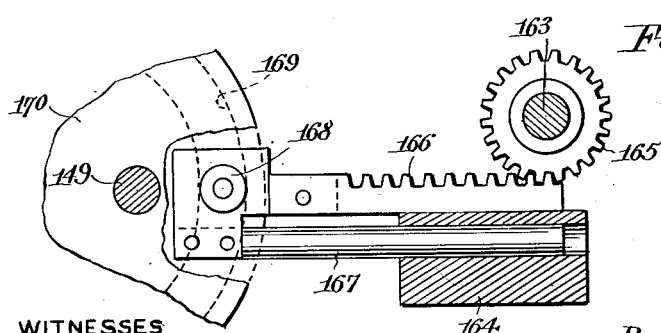
Fig. 3.ª

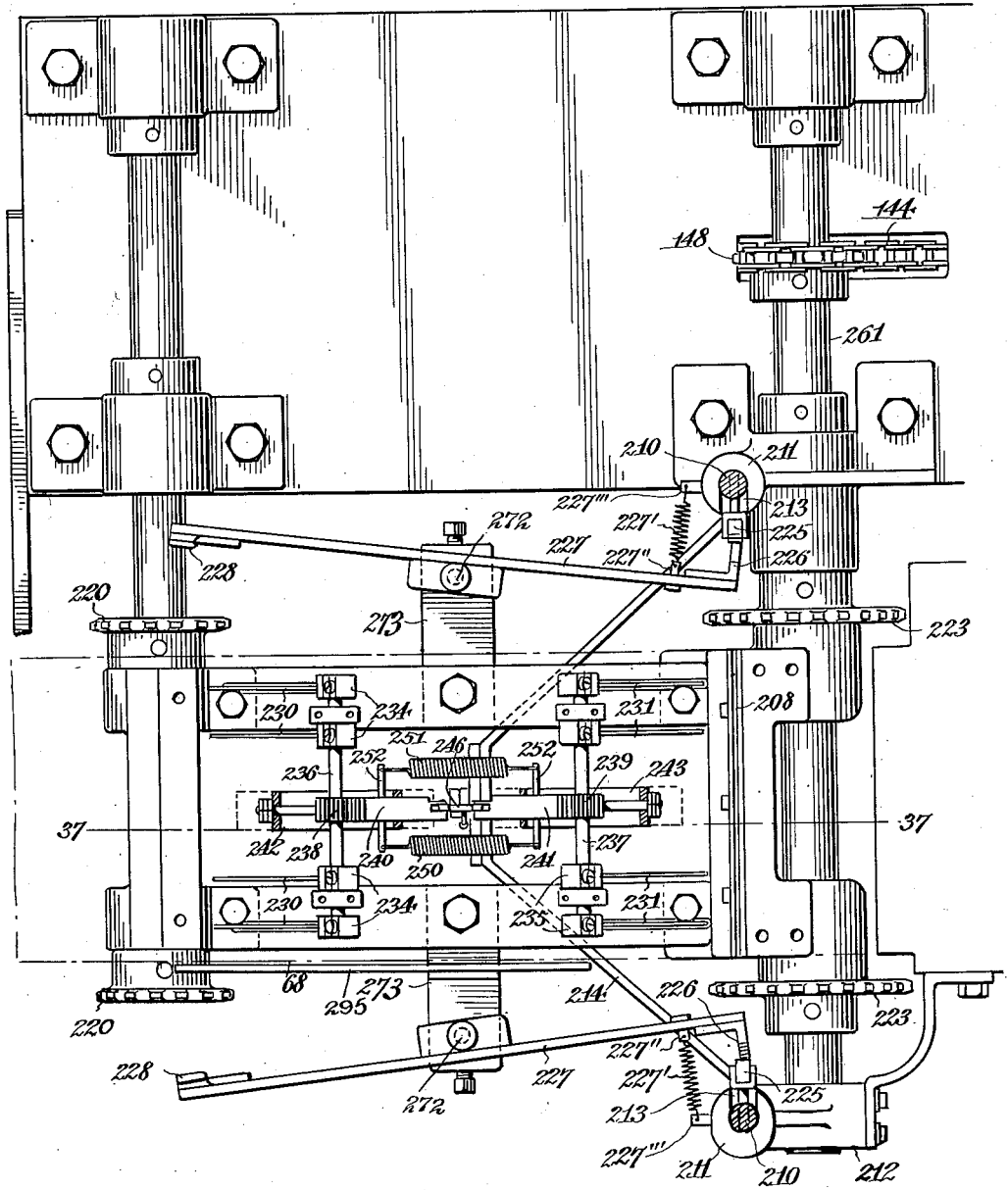

May 21, 1940. B. ROTTENBERG 2,201,872
CUTTING, SHAPING, EMBOSSING, AND WRAPPING MACHINE FOR
BUTTER OR SIMILAR PLASTIC MATERIAL
Filed April 2, 1937 16 Sheets-Sheet 7
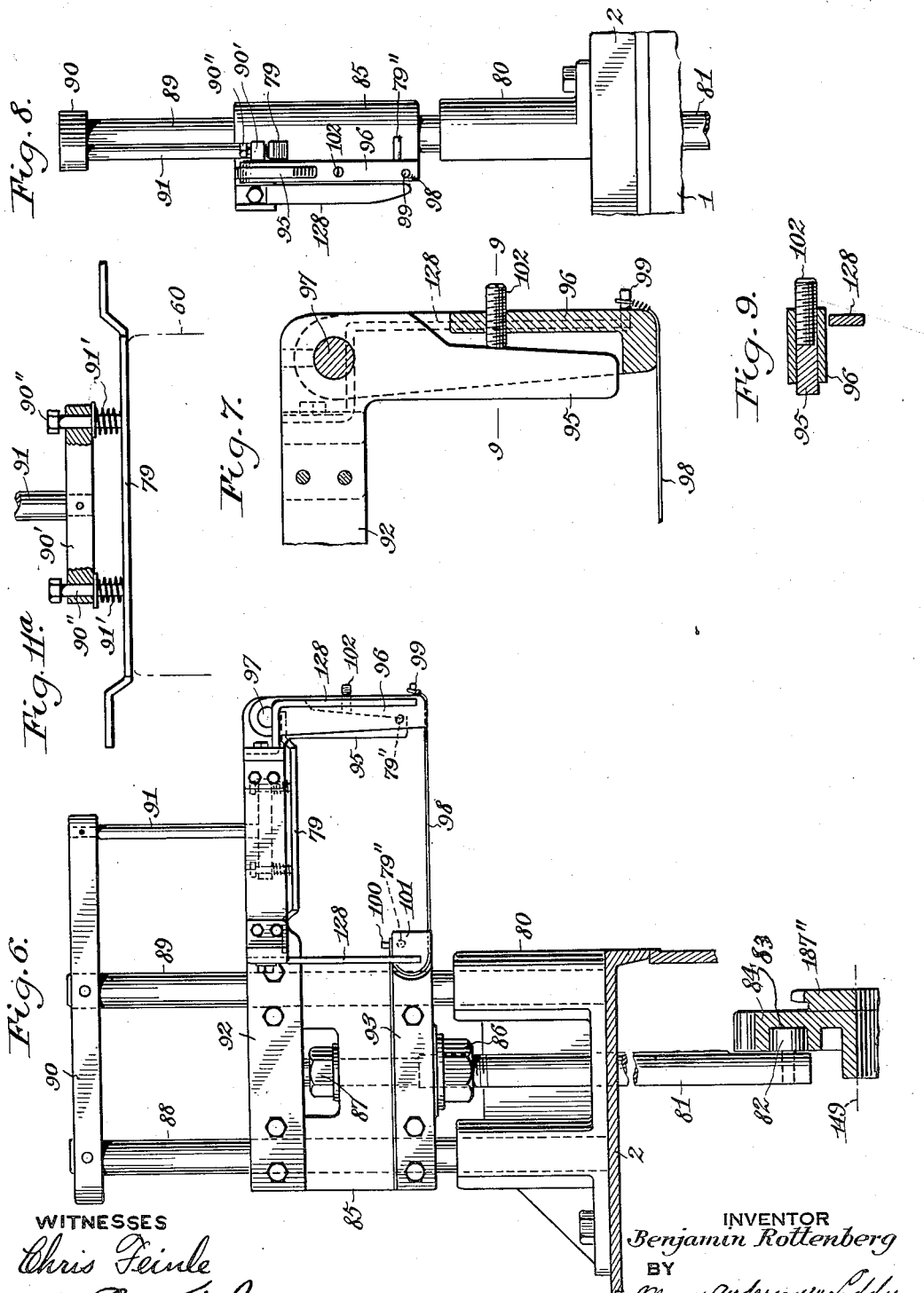
INVENTOR
Benjamin Rottenberg

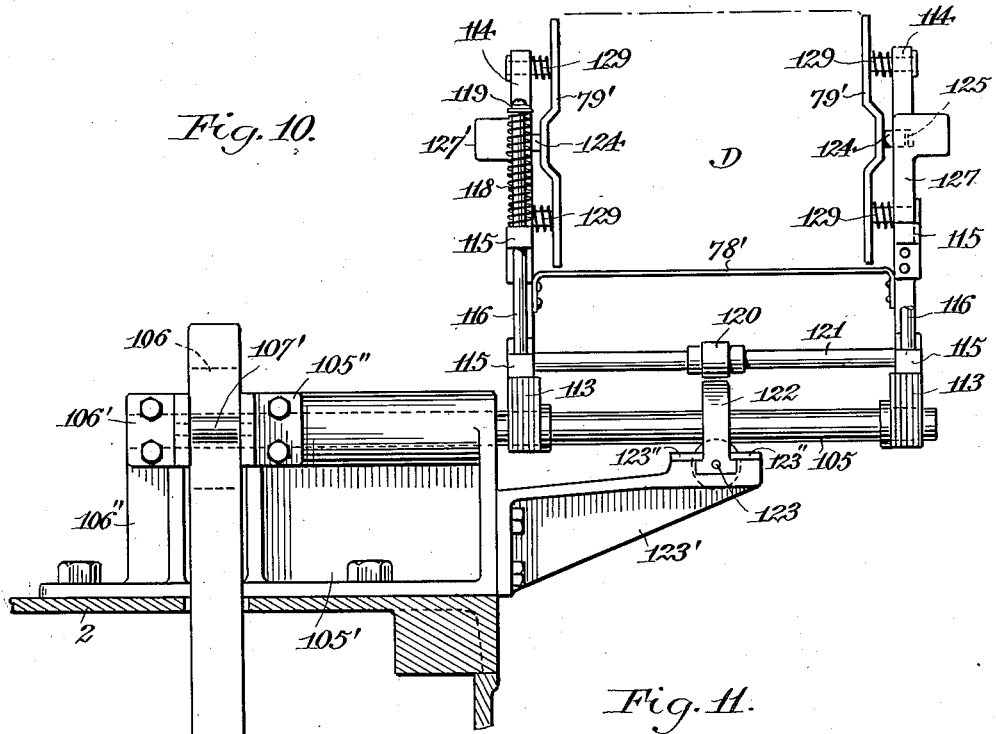
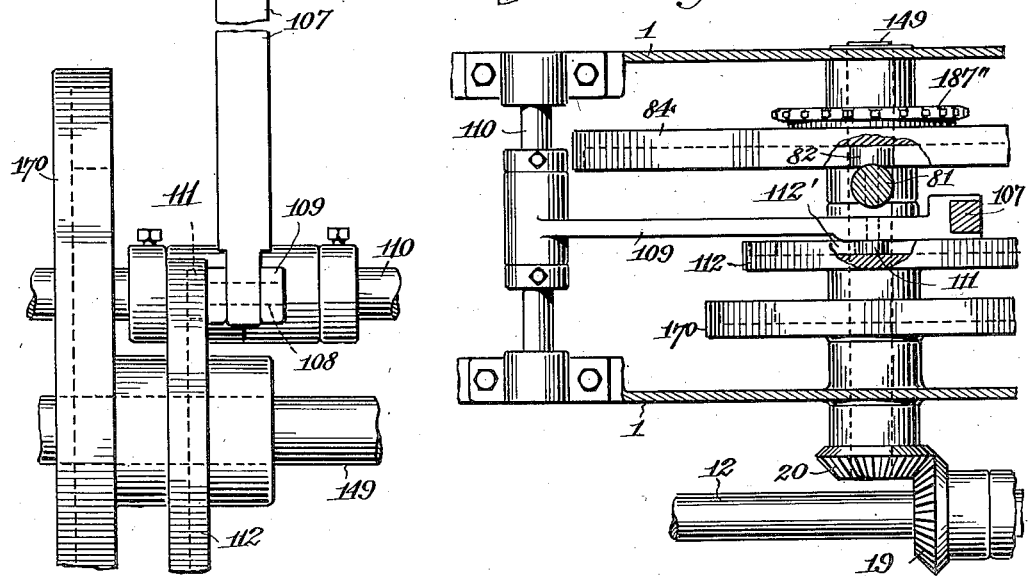

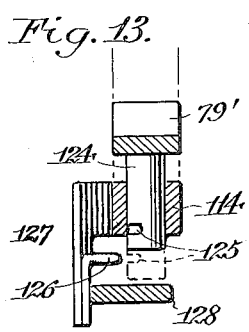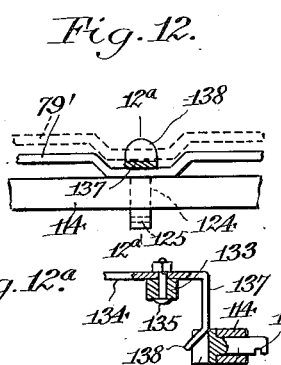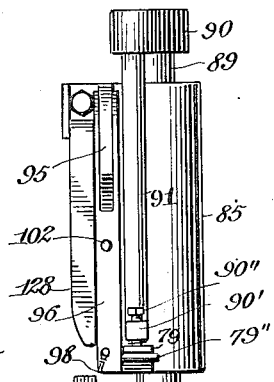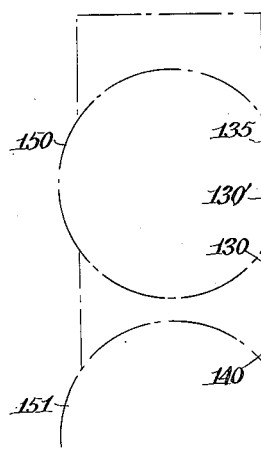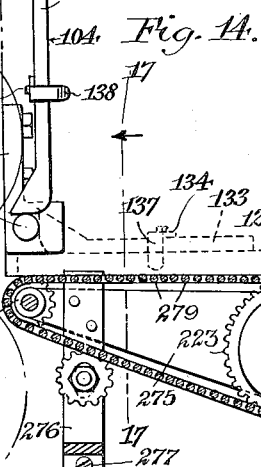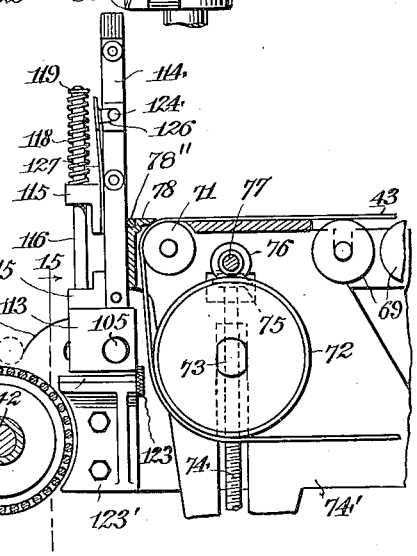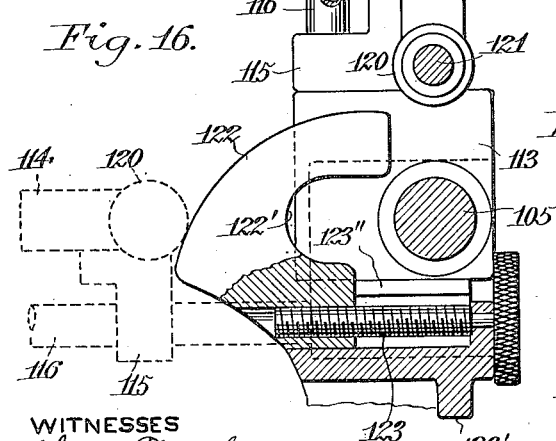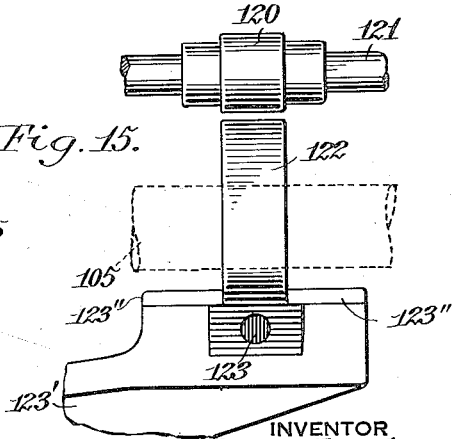

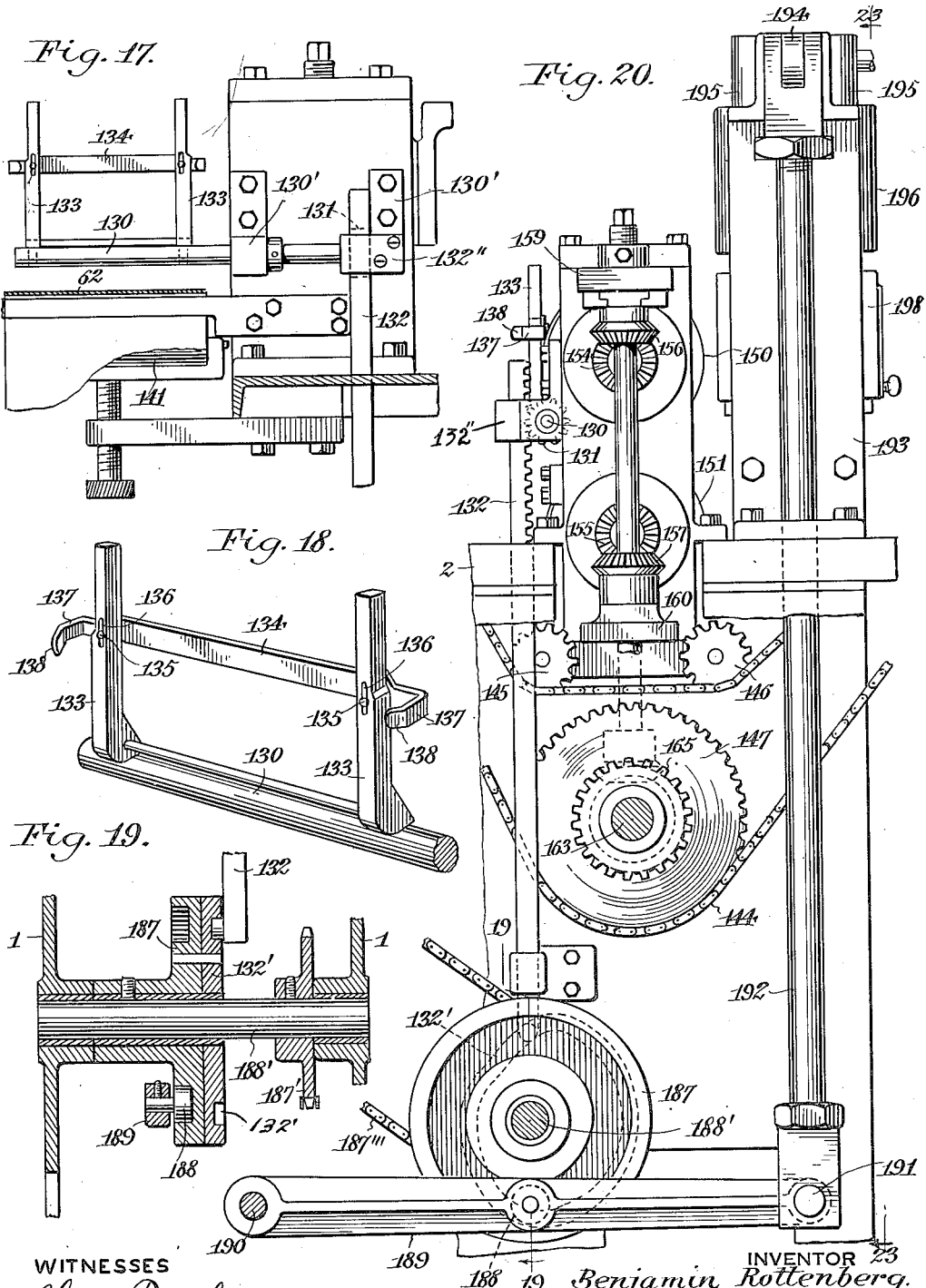

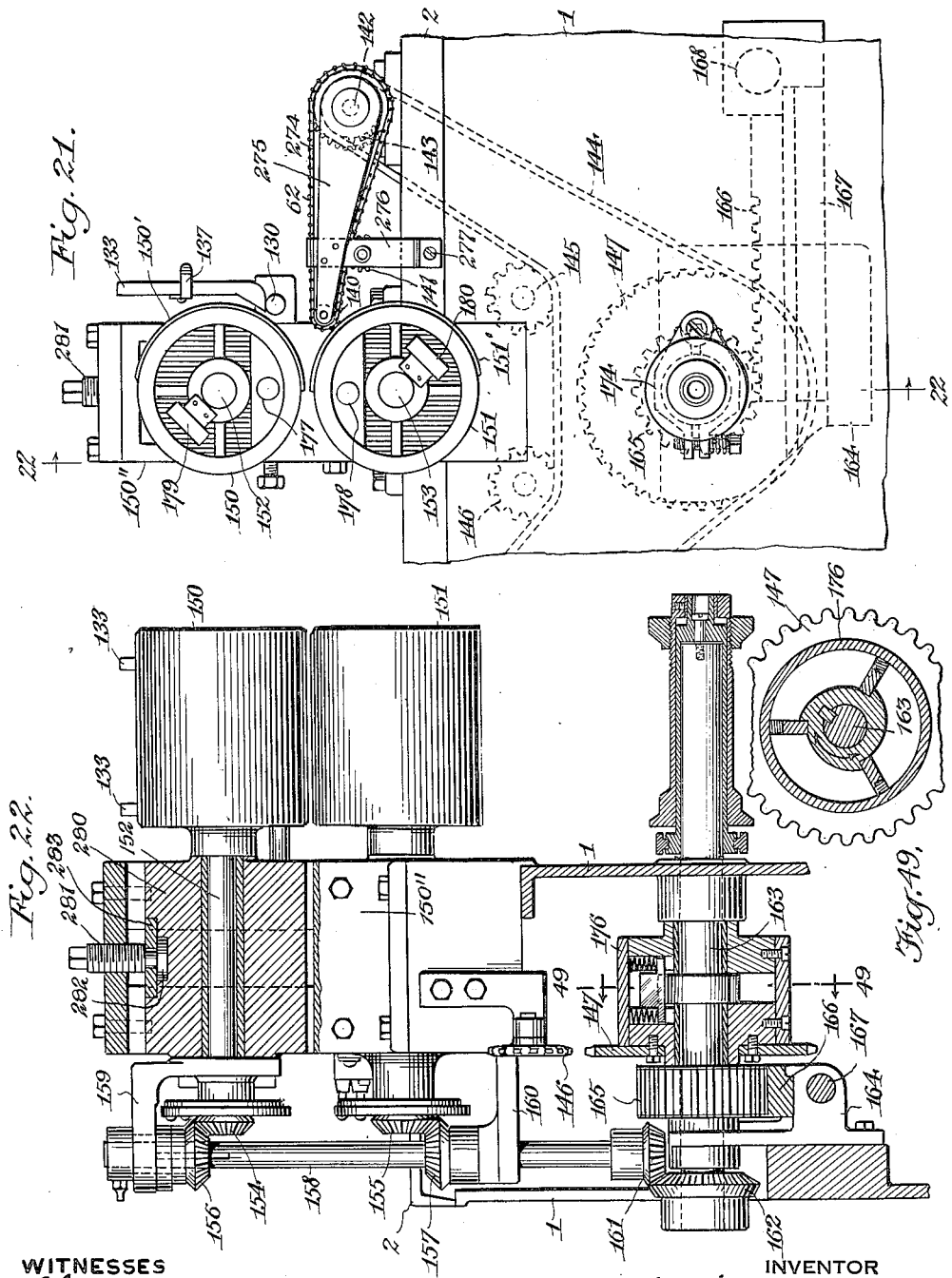

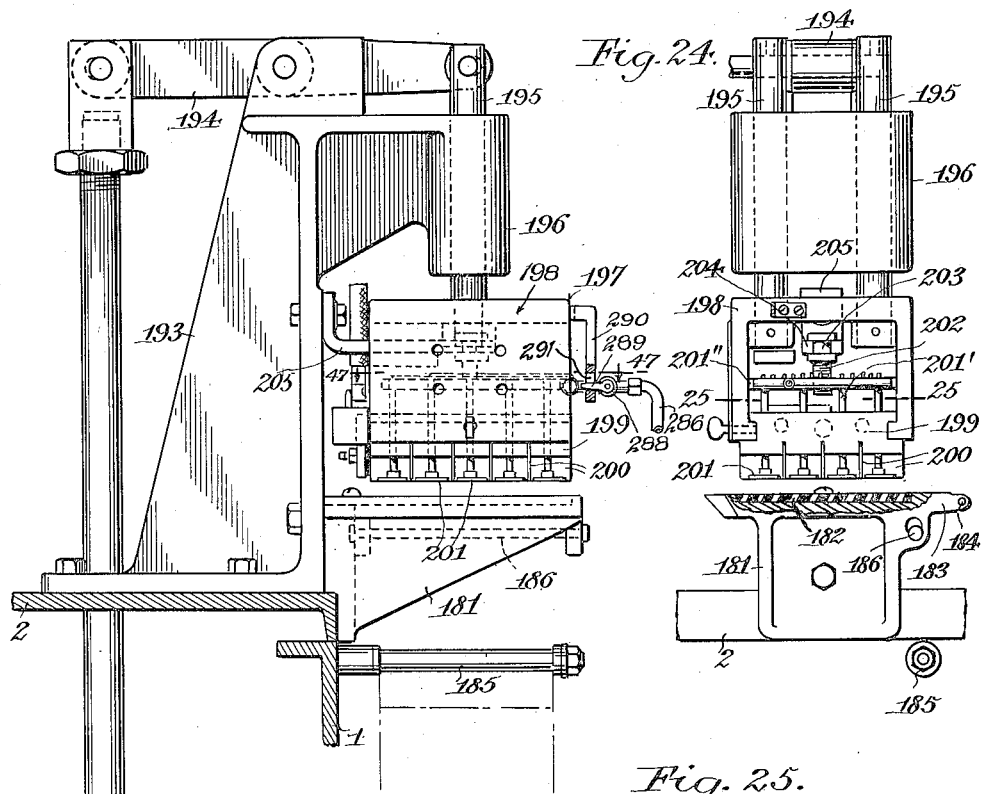
Fig. 24.
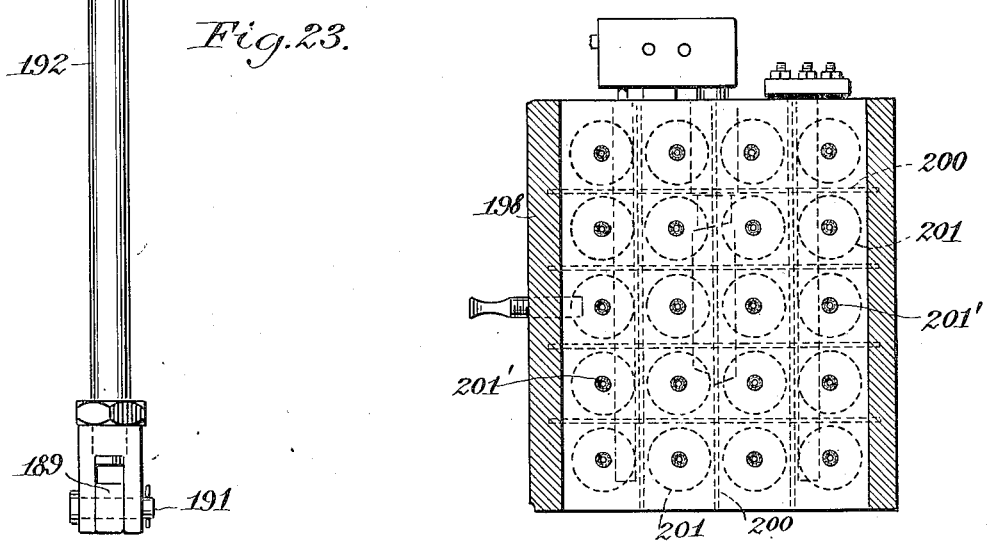
Fig. 23.
Fig. 25.

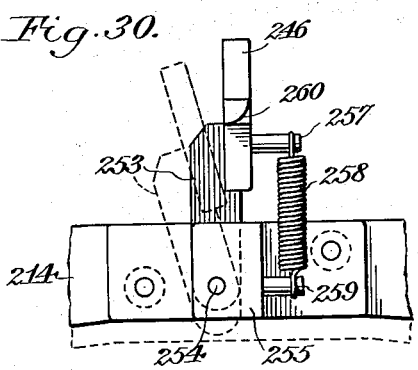
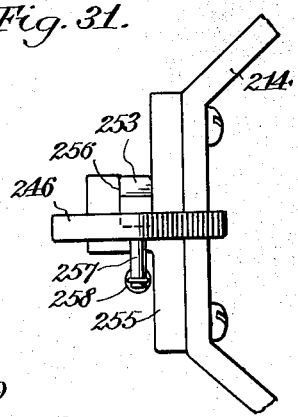
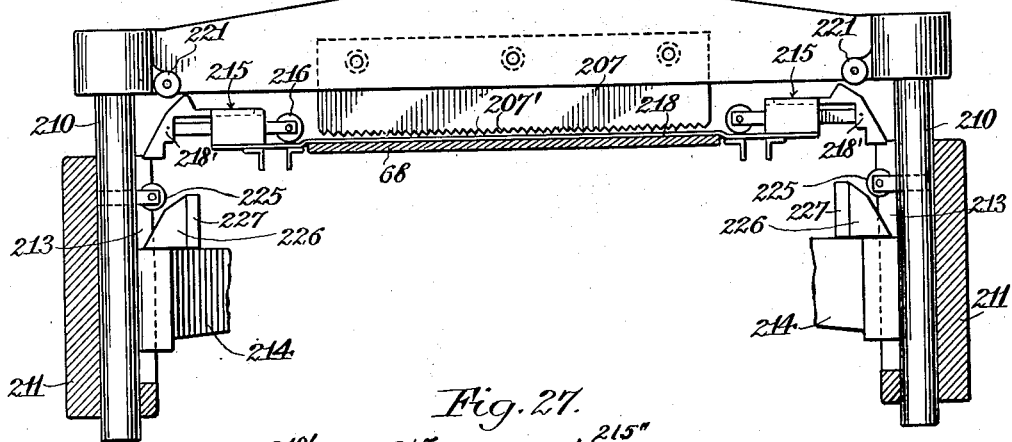
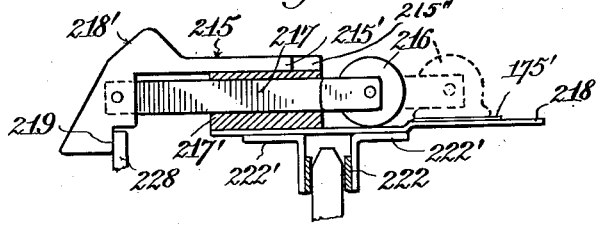
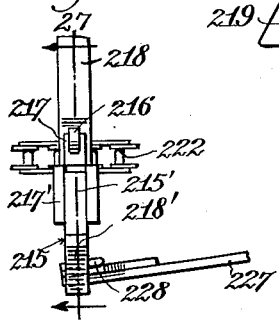
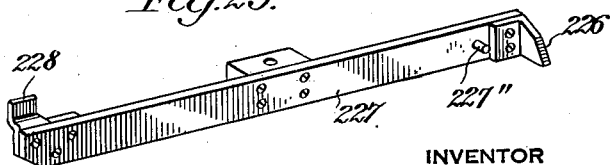

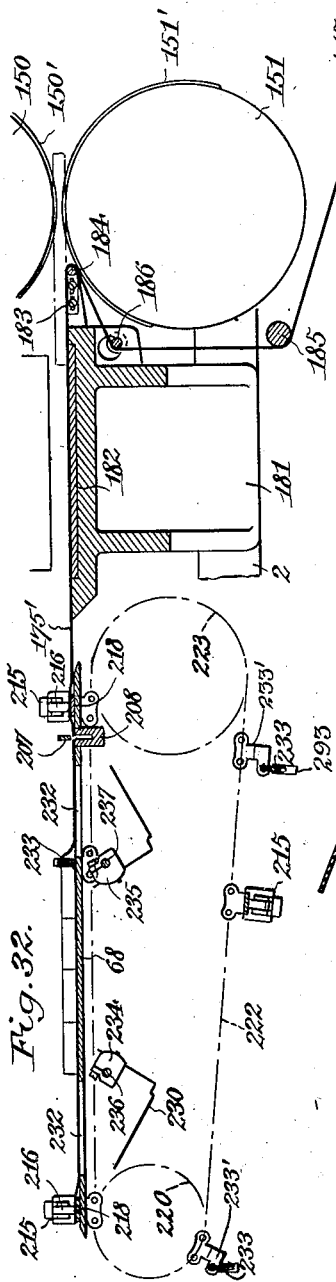

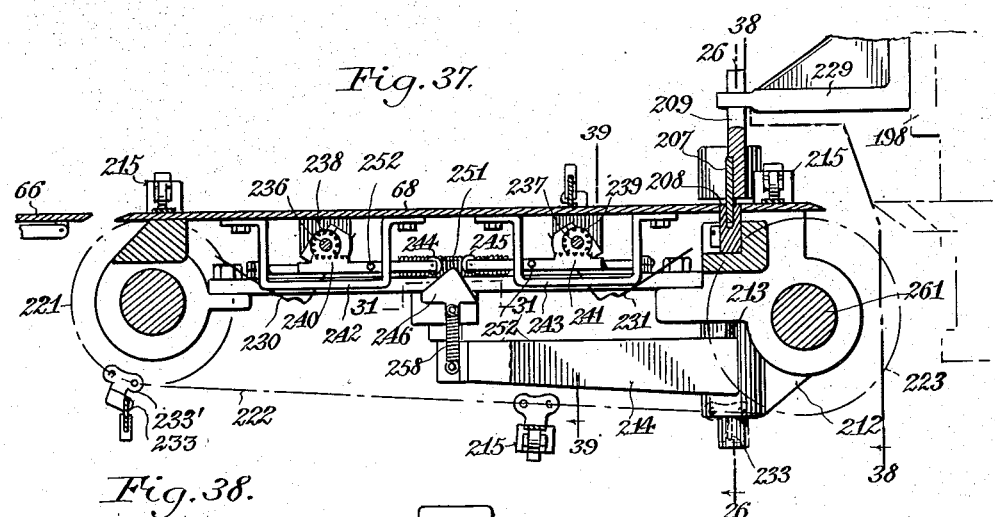
Fig. 37.
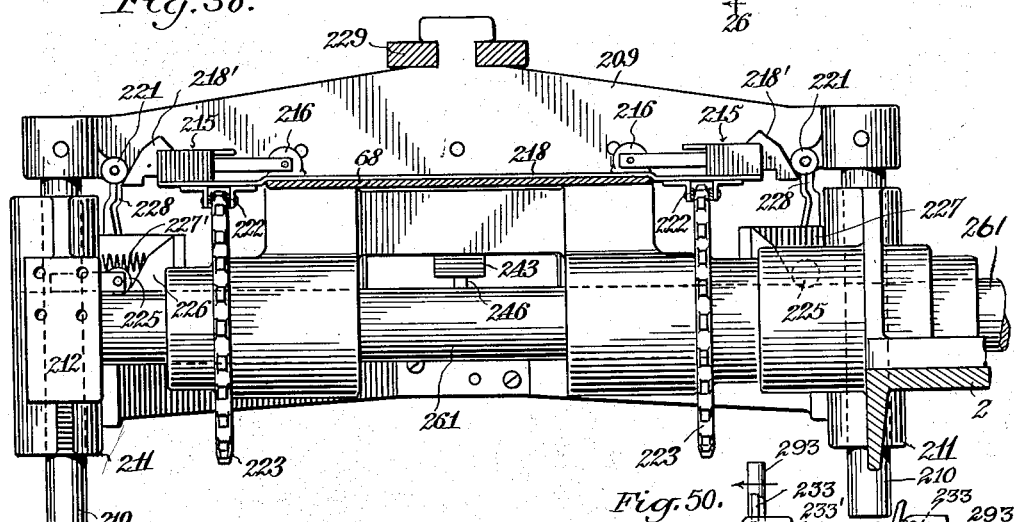
Fig. 38.
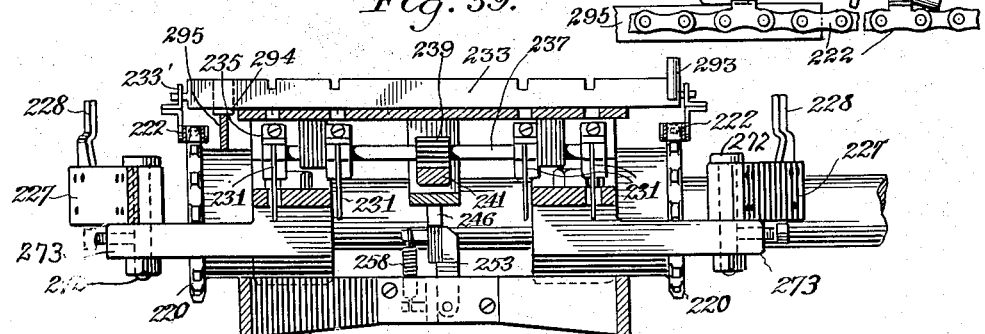
Fig. 39.
Fig. 50.
INVENTOR
Benjamin Rottenberg.
BY
Munn, Anderson & Liddy.
ATTORNEYS INVENTOR
Benjamin Rottenberg
BY
ATTORNEYS Patented May 21, 1940

2,201,872

UNITED STATES PATENT OFFICE 2,201,872

CUTTING, SHAPING, EMBOSSING, AND WRAPPING MACHINE FOR BUTTER OR SIMILAR PLASTIC MATERIAL

Benjamin Rottenberg, New York, N. Y.

Application April 2, 1937, Serial No. 134,519

17 Claims. (Cl. 31—20)

This invention relates to a cutting machine, and has for an object to provide an improved construction wherein a comparatively large lump of plastic material, as butter, is moved from place to place and acted upon so that eventually it will be cut into small chips or blocks embossed with a letter or other legend, wrapped, and finally discharged.

Another object of the invention is to provide a machine for cutting butter or other plastic material into small blocks or chips from a large block, the structure being such that the large block is first sliced, then embossed, and finally cut into the desired number of small blocks.

An additional object is to provide a cutting machine wherein a large block may be cut into small blocks or chips, the structure being such that the parts may be readily adjusted to secure blocks or chips of various thicknesses according to the desire of the cutter.

An additional object is to provide a cutting machine which is adapted to cut a large supply of butter or other plastic material into small blocks or chips, emboss and wrap the same without the necessity of the butter or other material being touched by the hands of the operator.

In the accompanying drawings—

Fig. 1 is a side view of approximately one-half of a butter cutting machine disclosing an embodiment of the invention;

Fig. 1ᵃ is a side view of the other half of the butter cutting machine to that shown in Fig. 1;

Fig. 2 is a top plan view of the structure shown in Fig. 1;

Fig. 2ᵃ is a side view of the structure shown in Fig. 1ᵃ, but looking at the machine from the opposite side;

Fig. 2ᵇ is a sectional view through Fig. 2ᵃ approximately on the line 2ᵇ—2ᵇ;

Fig. 2ᶜ is a sectional view through Fig. 2ᵇ approximately on the line 2ᶜ—2ᶜ;

Fig. 3 is a top plan view of the structure shown in Fig. 1ᵃ;

Fig. 3ᵃ is a fragmentary view partly in section illustrating how power is transmitted to conveyor belts, embossing mechanism and paper feed;

Fig. 4 is a side elevation of the structure shown in Fig. 1, but showing the opposite side of the machine;

Fig. 5 is a top plan view on an enlarged scale of the wrapping and ejecting mechanism shown in Figs. 1 and 2, certain parts being eliminated for better illustrating the operating structure;

Fig. 6 is a sectional view through Fig. 2 approximately on the line 6—6, the same showing principally an elevation of the slicing mechanism;

Fig. 7 is an enlarged fragmentary view partly in section showing a swinging adjustment for the cutting wire illustrated in Fig. 6;

Fig. 8 is an edge view of the upper part of the structure shown in Fig. 6;

Fig. 9 is a fragmentary sectional view through Fig. 7 approximately on the line 9—9;

Fig. 10 is a fragmentary sectional view through Fig. 2 approximately on the line 10—10, the same showing gripping and swinging mechanism embodying certain features of the invention;

Fig. 11 is a fragmentary horizontal sectional view showing principally in top plan view the cams and associated mechanism illustrated in Fig. 10;

Figure 1:
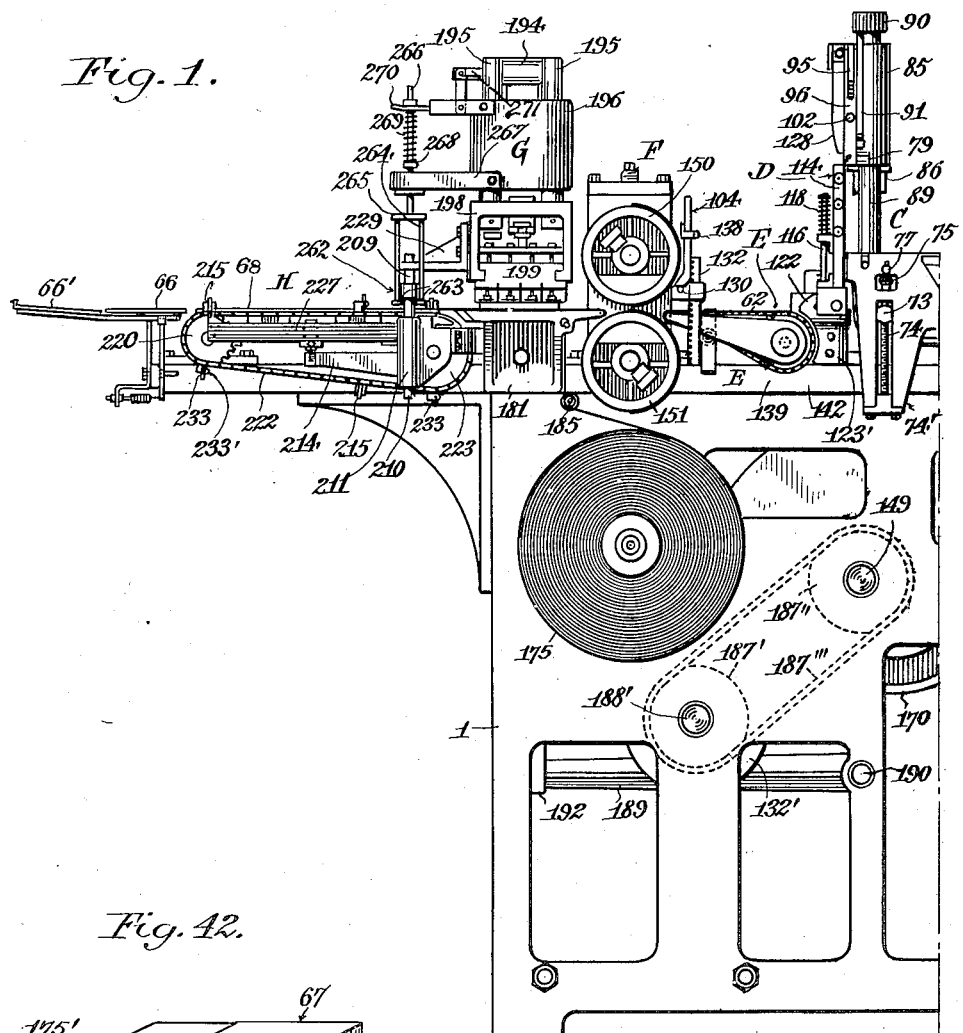
Figure 42:
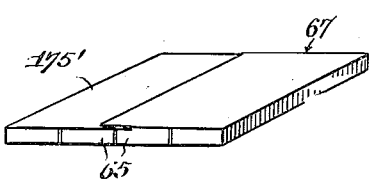
Figure 40:
Figure 41:
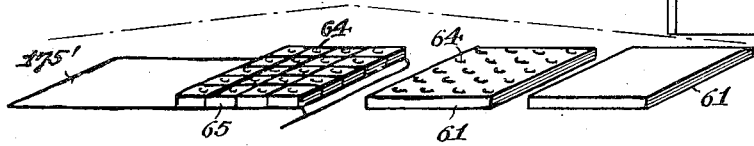
Figure 43:
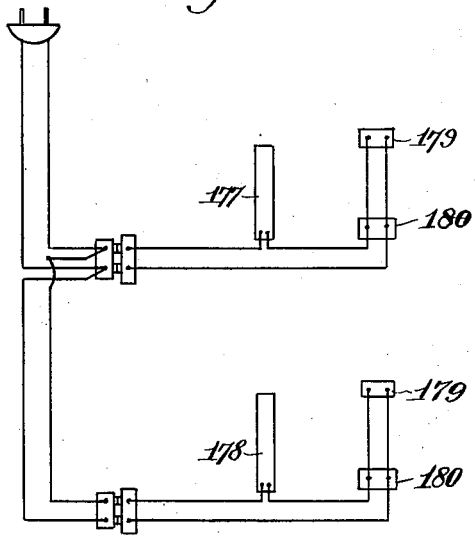
Figure 44:
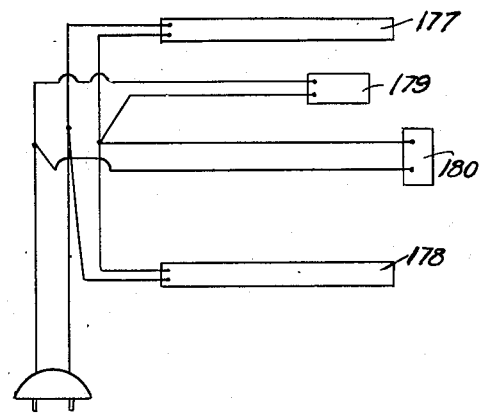
Figure 2:
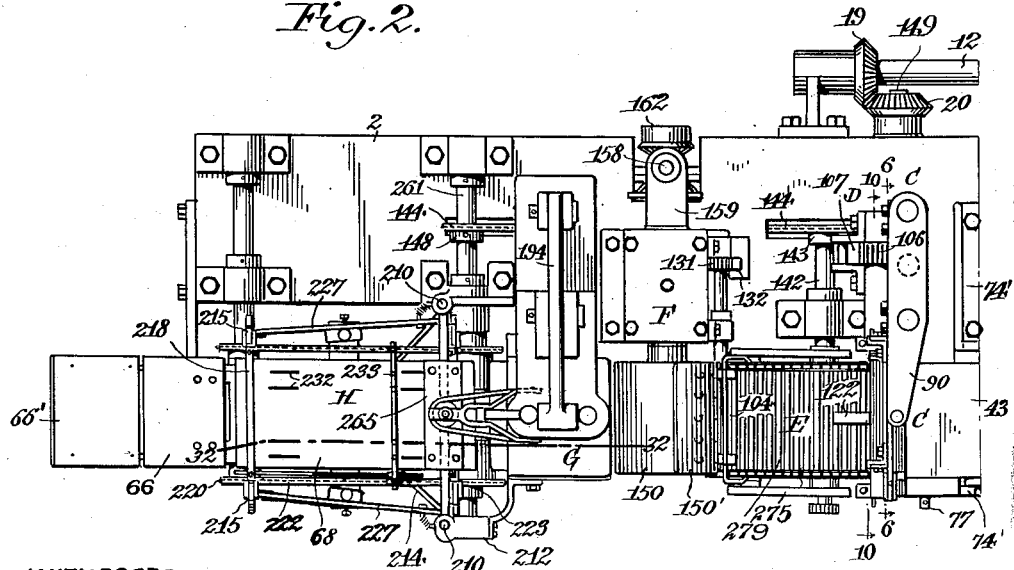
Figure 45:
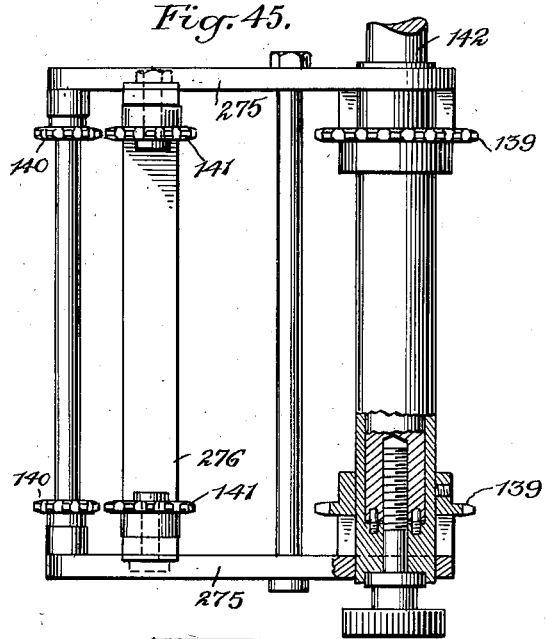
Figure 46:
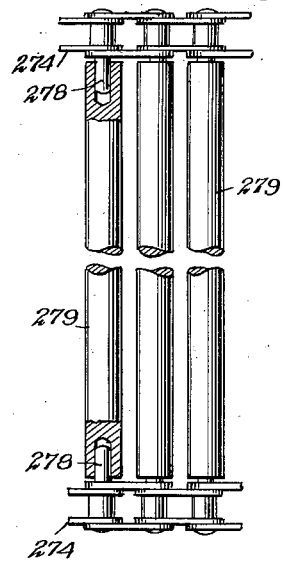
Figure 47:
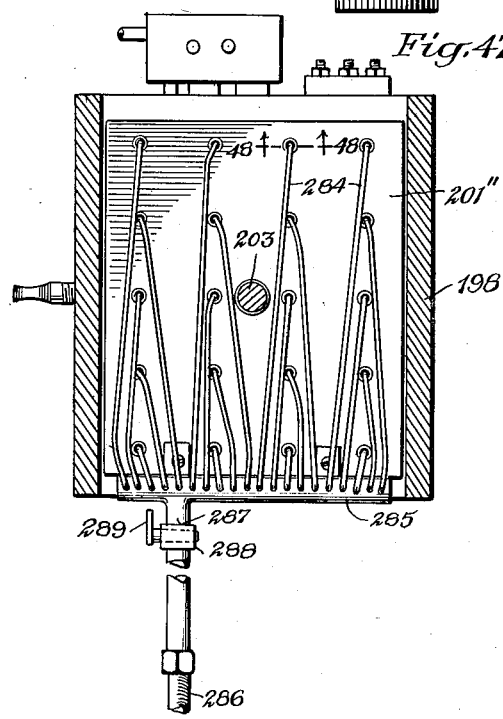
Figure 48:
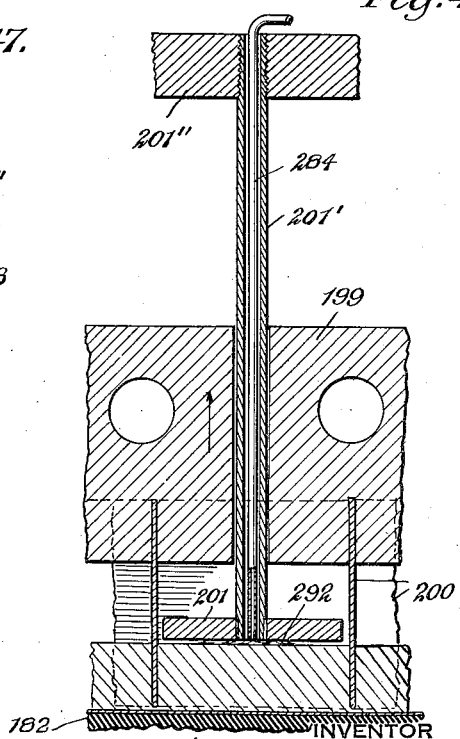

Fig. 11ᵃ is a detail view showing the gripper member illustrated in Fig. 6;

Fig. 12 is a fragmentary view illustrating means for retracting the clamps shown in Fig. 10;

Fig. 12ᵃ is a sectional view through Fig. 12 approximately on the line 12ᵃ—12ᵃ;

Fig. 13 is a fragmentary sectional view illustrating a holding mechanism for the clamps shown in Fig. 12;

Fig. 14 is a view partly in elevation and partly in section illustrating a transfer belt and associated mechanism;

Fig. 15 is a fragmentary elevation of part of the butter clamping and swinging mechanism shown in Fig. 10, the same being taken on line 15—15 of Fig. 14;

Fig. 16 is a fragmentary side view of the mechanism shown in Fig. 15, together with part of the swinging mechanism arranged thereabove;

Fig. 17 is a fragmentary sectional view through Fig. 14 approximately on the line 17—17, illustrating the releasing mechanism for releasing the butter from the grippers shown in Fig. 10;

Fig. 18 is an enlarged perspective view of the rocking bar, releasing bar, and associated parts shown in Fig. 17;

Fig. 19 is a fragmentary sectional view through Fig. 20 approximately on the line 19—19;

Fig. 20 is a view principally in side elevation showing the drive mechanism for the printing rollers shown in Fig. 21;

Fig. 21 is a fragmentary side elevation of the printing rollers shown in Figs. 1 and 2 and associated parts;

Fig. 22 is a sectional view through Fig. 21 approximately on line 22—22;

Fig. 23 is a fragmentary sectional view through Fig. 20 approximately on line 23—23;

Fig. 24 is an edge view of the upper structure shown in Fig. 23;

Fig. 25 is a sectional view through Fig. 24 approximately on the line 25—25, the same being on an enlarged scale;

Fig. 26 is a sectional view through Fig. 37 approximately on the line 26—26;

Fig. 27 is a fragmentary sectional view through Fig. 28 approximately on the line 27—27;

Fig. 28 is a top plan view of the structure shown in Fig. 27 and associated parts, the same being on a slightly reduced scale;

Fig. 29 is a perspective view of the releasing bar shown in Fig. 5;

Fig. 30 is an elevation of the structure shown in Fig. 31;

Fig. 31 is a top plan view of the cam and associated parts shown in Fig. 37;

Fig. 32 is a longitudinal vertical sectional view through Fig. 2 approximately on the line 32—32, certain of the moving parts being eliminated for the purpose of clearness;

Fig. 33 is a view similar to Fig. 32, but showing the parts on an enlarged scale and only the central portion of the structure illustrated in Fig. 32 with one folding finger in clamping position and the other in a raised position;

Fig. 34 is a view of the parts shown in Fig. 33, but in an advanced position;

Fig. 35 is an enlarged view of the cam and associated parts shown in Fig. 37;

Fig. 36 is a view similar to Fig. 35, except that the cam has been moved almost to its upper extreme position;

Fig. 37 is a sectional view through Fig. 5 approximately on the line 37—37, the same being on an enlarged scale;

Fig. 38 is a transverse view on an enlarged scale through Fig. 37 approximately on the line 38—38;

Fig. 39 is a fragmentary sectional view on an enlarged scale through Fig. 37 approximately on the line 39—39;

Fig. 40 is a perspective view of a block of butter showing one slice severed from the block but still contacting therewith;

Fig. 41 is a perspective view illustrating a slice of butter as it progresses from block 41 to the wrapping mechanism;

Fig. 42 is a perspective view of a slice of butter after it has been embossed, cut, and wrapped;

Fig. 43 is a diagram showing a heater for the embossing rollers;

Fig. 44 is a diagram of the electric wiring showing the arrangement of heater and associated parts for the cutter;

Fig. 45 is a top plan view of a transfer carrier frame embodying certain features of the invention;

Fig. 46 is a fragmentary top plan view of part of a transfer carrier belt used on the frame shown in Fig. 45;

Fig. 47 is a sectional view through Fig. 23 on line 47—47;

Fig. 48 is an enlarged fragmentary sectional view through Fig. 47 on line 48—48;

Fig. 49 is a sectional view through Fig. 22 on line 49—49;

Fig. 50 is an end view of a pusher bar and associated parts including the operating chain and guide rail.

Referring to the accompanying drawings by numerals, 1 indicates a frame provided with suitable side members together with suitable cross members so as to support the various parts in proper assembled relation. To the frame is secured a table or platform 2 by any suitable means, as for instance, bolts. This table or platform is shown in section in Fig. 23. On this table are mounted various brackets and other parts which support or hold in proper position certain moving parts hereinafter more fully described.

The lower part of frame 1 carries a motor 3 which may be an electric motor of any desired kind. This motor is connected with a gear reduction mechanism of any desired kind whereby the comparatively high speed of the motor 3 will be reduced to a much slower speed so as to drive the various parts at the prescribed speed. The reducing gear 4 may be of any desired kind and may be adjusted to vary the speed of rotation of the beveled gear 5 as shown in Fig. 2ª. A suitable bracket 6 supports the casing of reducing gear structure 4, but it will be evident that this structure and the motor also may be supported by the frame 1 through any suitable means. Beveled gear 5 continually meshes with beveled gear 7 carried by shaft 14 rotatably mounted in a bearing 8, which bearing is mounted on a bracket 9 secured to frame 1. Bracket 9 is provided with bearings or journal members 10 and 11 for rotatably supporting the main drive shaft 12. Beveled gear 13 transmits power from the shaft 14 rotatably mounted in bearing 8 and continually meshes with the beveled gear 15 rigidly secured to shaft 12. Shaft 12 transmits power through the beveled gear 16 to beveled gear 17, which in turn rotates the shaft 18. Also the shaft 12 transmits power through the beveled gear 19 (Fig. 2) to beveled gear 20 so as to drive the mechanism at the opposite end of frame 1 from where the motor 3 is located.

As shown in Fig. 2ᵇ, shaft 18 has rigidly secured thereto a cam 21 as well as cam 22. Cam 21 acts to rock the clutch lever 23 so as to move the clutch 24 into and out of clutching engagement with member 25 which is loosely mounted on shaft 26. Clutch 24 is splined to shaft 26 and has a sprocket wheel 27 rigidly secured thereto so that sprocket wheel 27 will rotate whenever the clutch member 24 rotates. During the functioning of the machine it will be understood that the shaft 12 continually rotates at an even speed and consequently the shaft 18 will also rotate at an even speed so that cams 21 and 22 are continually rotating. Cam 21 is so formed that for part of the time the clutch 24 is engaged and part of the time it is disengaged. This results in shaft 26 being given an intermittent rotary movement and also sprocket wheel 27 an intermittent rotary movement. This movement is transmitted from shaft 18 through the cam 22 to a reciprocating bar 28 (Fig. 2ᵇ) which is adapted to strike the reciprocating rod 29 and raise the same. Rod 29 is provided with an adjustable stop 30 and a spring 31 which continually tends to lower the rod. The upper end of the rod is threaded at 32 and carries a nut 33 having gear teeth on the outer surface meshing with the gear wheel 34 which is rigidly secured to the adjustable pin 35. Pin 35 carries a hand knob 36. Whenever desired the operator may rotate knob 36 which will in turn rotate gear 34 which is in continuous mesh with the nut 33.

When the parts are rotated in one direction spring 31 is permitted to move the rod 29 downwardly so that the bar 28 will strike the same at an earlier time. Rod 29 is pivotally connected at 37 to the clutch member 25 so that when the friction members 24 and 25 are in engagement both clutch members will be moved a certain distance upon each rotation of cam 22. The opening in rod 29 which receives the pivot pin 37 is sufficiently elongated to take care of arc-shaped travel of pin 37 as rod 29 reciprocates. The member 25 rotates in one direction through the upward movement of rod 29 and associated parts, and then by reason of spring 31 rotates back to the former position. This back and forth movement intermittently feeds the clutch member 24 forwardly, and consequently intermittently rotates the shaft 26 which is supported by suitable journal members 38 and 39. Shaft 26 extends through the guard plate 40 which is supported by suitable brackets 41 on the table 2. Shaft 26 is rigidly secured to the drum 42 carrying one end of the feed belt 43. A sprocket chain 44, as shown in Fig. 3, connects sprocket 27 with a sprocket 45 which is rigidly secured to a clutch member 46 rigidly secured to the shaft 47 and coacting with the clutch member 46', which latter clutch member is splined to shaft 47. Shaft 47 is rigidly secured to the drum 48 that carries one end of the loading belt 49. The opposite end of belt 49 passes over the idler drum 50 which is carried by the shaft 51 mounted in suitable bearings on the platform 2. A tension roller 52 engages the belt 49 near the center. This roller is rotatably mounted on a suitable U-shaped carrier 53 connected with the screw 54 which is threaded through the member 55 whereby the U-shaped member 53 may be raised and lowered, as shown in Fig. 1ª, to provide the desired tension for belt 49. As shown in Fig. 1ª, belt 49 passes over idler pulleys or rollers 56 and 57. By the construction just described it will be noted that the loading belt 49 will intermittently move in the direction of the arrow 58, shown in Fig. 3. Also the feed belt 43 is intermittently fed forwardly in the direction of the arrow 59, as shown in Fig. 3. Clutch member 46' may be slid away from clutch member 46 manually by operating the forked lever 46", whereby the loading belt 49 may be stopped any time without stopping the feed belt 43.

The loading belt 49 and associated parts may be known as station A, while the feed belt 43 and associated parts may be known as station B. Butter or other plastic material in a large load or block, as shown in Fig. 40, is placed on station A and is fed on to the belt of station B. When the term "butter" is used hereafter it will be understood that butter or other plastic material is intended. As belt 43 continues to move, the block of butter 60 will move toward the slicing mechanism or station C (shown in Fig. 1), and after a slice 61 has been made it is engaged by the gripper mechanism D (Figs. 1 and 10) and then turned to a horizontal position and placed on the transfer structure E (Figs. 1 and 2) which consists of a carrier belt 62 and associated parts. From belt 62 the slice of butter passes to the embossing station F, then to the cutting station G, engaging the wrapping paper on its passage from station F to station G, and finally to the wrapping and ejecting station H. The block 60 may be of any desired size, but is preferably made as a rectangular block, as shown in Fig. 40, and one desirable size is a block five inches high and six inches wide. The embossing station F and the cutting station G, as well as the other stations, must be all adjusted or proportioned to the size of the slice 61.

In case a larger block is to be cut, suitable sized embossing rollers must be used and also the cutters in the cutting mechanism G must be adjusted or new ones provided of a desired size and spacing to take care of the new sized block. The slice 61 (Fig. 41) is engaged by the gripping mechanism D and is laid down on the carrier belt 62 and then fed to the embossing mechanism F which embosses suitable letters or other legends 64, as shown in Fig. 41. This embossing is done while the slide 61 is in one piece and on both sides, although it could be embossed on one side by substituting a smooth plate for the plate shown. The embossed slice is then moved to a position beneath the cutting knives or blades of the mechanism G which cuts the slice into blocks or chips 65, as shown in Fig. 41. The parts are so proportioned that the letters or legends 64 will be positioned on the slice 61 so that there will be a letter or legend on any or all of the chips 65, as may be desired.

After the cutting mechanism has functioned, the butter is moved on to the wrapping and ejecting station H where it is automatically wrapped and then forced on the discharge platform 66. Upon the completion of the wrapping of the first chipped slice the ejecting mechanism moves the same on to platform 66 and when the next wrapped chipped slice is forced on to platform 66 it will in turn force the first wrapped chipped slice or package on to the platform 66' which may be substantially horizontal or may be inclined, as shown in Fig. 1, so that the wrapped chipped slice 67 (Fig. 42) may slide into a box or other container. When the wrapped chipped slice or package 67 has been forced off of the platform 66 on to platform 66' the work of the machine has been completed.

As shown in Figs. 1ª and 3, the feed belt 43 is supported by a number of rollers 69 which are journaled in suitable notches in the respective supporting rails 70. These rails are supported by the respective brackets 41 and 41'. Belt 43 extends from drum 42 over an idler 71 (Fig. 14) and then over the vertically adjustable drum 72. The journal shaft 73 of drum 72 is carried by the adjusting screws 74, each screw 74 being provided with a beveled gear 75 at the upper end, and the gear 75 meshes with the beveled gear 76 carried by the horizontally positioned shaft 77 which extends to one side of the machine where a wrench or other device may be connected therewith for rotating gears 76 when it is desired to adjust the drum 72 upwardly or downwardly in order to secure a proper tension on belt 43. Screws 74 are carried by a suitable bracket 74' secured to the platform 2 in any desired manner. If desired, the apron 78 (Fig. 14) could be made removable. This apron is intended to guide and support the block 60 of butter adjacent its outer edge when the slicing mechanism C functions, and also to provide a resilient base 78" for cutting member 98.

When the machine is in operation, a block or continuous ribbon of butter 60 is fed on to the loading structure A by any suitable extruding machine or other device, and from thence it is automatically fed on to the belt 43 and then automatically moved by belt 43 intermittently toward the apron 78 illustrated in Fig. 14. If a continuous ribbon of butter is not used, then as one block of butter leaves the loading structure A, another block is placed thereon manually or otherwise, as may be preferred. As the machine continues to function, successive blocks of butter must be placed in position on the loader and from then on the machine will automatically take care of the butter. When the butter reaches the apron 78 shown in Fig. 14, the next succeeding movement will cause the butter to project forwardly the thickness of the slice 61, which may be adjusted to any thickness. If the intermittent movement of the belt 43 is a half inch upon each movement, the butter will project beyond the apron 78 one-half an inch. When this takes place and while the block of butter is stationary, the slicing mechanism moves downwardly and then upwardly for completing one cycle of operation. As the block of butter 60 is moved to project beyond the wooden or similar hygroscopic apron 78, it will project over the supporting bar 78' (Fig. 10), and the spring pressed member 79 (Fig. 11ᵃ) supports and steadies the block 60 just behind the slicing member during the operation of cutting the slice 61. While the projecting portion of the block is engaging bar 78' the cutting mechanism will function. During the time the block 60 is moving to project a portion beyond apron 78, the clamping members 79' will be held apart by catches 126 (Fig. 13) as hereinafter fully described. After the cutting member 98 has completed its cutting operation and is about to leave the block of butter, the pins 79'' will engage the shoulders of bar 79 and will slightly raise this bar so that the block of butter may be readily fed forwardly for the next cutting operation.

The slicing mechanism is shown in detail in Figs. 6 to 9 inclusive. From these figures it will be observed that there is a guiding structure 80 carried by the platform 2, and through this guiding structure and also through platform 2 extends a vertical reciprocating rod 81 which at the lower end has a projection or roller 82 fitting into the cam groove 83 of cam 34. The upper end of the rod 81 extends through a slide block 85 and is rigidly clamped thereto by suitable nuts 86 and 87. Guiding rods 88 and 89 extend through the block 85 and into the guiding or supporting bracket 80 to which they are preferably rigidly secured. As the rod or bar 81 reciprocates, block 85 will slide up and down on the rods 88 and 89. These rods are rigidly secured to and support a top bar 90 to which is secured rod 91 (Figs. 6 and 11ᵃ). This rod supports a cross bar 90' carrying sliding pins or bolts 90'' secured to member 79. The springs 91' act to resiliently hold member 79 so that it will barely touch the block of butter 60 for steadying the same. Plates 92 and 93 (Fig. 6) are bolted or otherwise rigidly secured to block 85 and extend to one side thereof. Plate 92 is provided with a depending arm 95, as shown particularly in Fig. 7. An auxiliary arm 96 is pivotally mounted on plate 92 at 97. A cutting wire 98 is secured to pin 99 at the lower end of arm 96 and secured by pin 100 to the end portion 101 of bar 93. An adjusting screw 102 is carried by the auxiliary arm 96, as shown in Fig. 7, so that when it is pressed against the arm 95 it will swing arm 96 in a direction for maintaining the cutting wire 98 under a desired tension. When the cutting mechanism shown in Fig. 6 moves downwardly, wire 98 cuts the slice 61 from block 60 and then moves upwardly to the position shown in Fig. 14 so that the other mechanism may function. As the cutting wire 98 and associated parts move downward the cams 128 secured to plate 92 also move downwardly and engage the spring extensions 127' of springs 127 and swing these springs outwardly so that the catches 126 (Fig. 13) secured to the springs will be forced out of their notches 125 in the stub shafts 124 which carry the clamping members 79', whereupon the springs 129 will force the clamping members 79' into clamping position in respect to the slice being formed. After the cutting operation is completed, the clamping members 79' shown in Fig. 10 will swing over to the dotted position shown in Fig. 14. This takes place in order that the slice of butter may be placed upon the transfer carrier belt 62. Following the downward swinging movement of the turning mechanism D, the release mechanism 104 moves downwardly to the dotted position shown in Fig. 14 and then back to its former position followed by a return movement of the turning mechanism D.

The turning mechanism D is provided with a rock shaft 105 rockably mounted in bracket 105' which in turn is secured to platform 2. A gear wheel 106 is rigidly secured to rock shaft 105 and continually meshes with the vertically reciprocating rack 107. The bracket 105' has an auxiliary bracket 105'' secured thereto which coacts with auxiliary bracket 106' carried by bracket 106''. The auxiliary brackets 105'' and 106' carry a roller 107' which acts to hold rack 107 in mesh with gear 106. Rack 107 is pivotally connected at 108 to an arm 109 (Fig. 11), which arm is journaled on shaft 110 supported in suitable journal boxes carried by the frame 1. A roller 111 extends from arm 109 into the cam groove 112' of the cam 112 so that whenever this cam rotates the parts will function. However, the shape of the cam groove 112' is such that the rack 107 will function in proper time to coact with the slicing mechanism and the release mechanism 104. Blocks 113 are rigidly secured to rock shaft 105 and upstanding rods 116 are secured at their lower ends to these blocks so as to swing therewith. On each of the rods 116 are mounted upper and lower sliding brackets 115, as shown particularly in Figs. 10 and 16, and carried by these brackets are arms 114. Springs 118 surround the respective rods 116 above the upper brackets 115 and act on these brackets and on abutments 119 connected to the respective rods at their upper ends. These springs tend to hold the respective brackets 115 and arms 114 in their lowered position. However, whenever the shaft 105 rocks for approximately a quarter of a revolution the roller 120 (Fig. 16) carried by the transverse rod 121 will strike the cam 122, whereupon transverse rod 121, brackets 115 and associated parts will move outwardly. The cam 122 is provided with a notch 122' whereby this cam may slide over the shaft 105. An adjusting screw 123 acts on cam 122 to move the same toward and from shaft 105 so as to vary the amount of outward movement of the brackets 115 and associated parts. Cam 122 is mounted to slide on bracket 123' secured to bracket 105'. The bracket 123' is provided with a pair of plates or turned-in members 123'' to guide the cam as it moves under the action of screw 123.

Referring to Figs. 10 and 13, it will be seen that the respective clamps 79' are each provided with a stud shaft 124. Each shaft is provided with a notch 125 for receiving the catch 126 extending from the respective springs 127. When the clamps 79' first move over the slice 61 they are held spaced apart by reason of the catch 126 (Fig. 13) being in notch 125. When the slicing mechanism C moves downwardly the cams 128 (Fig. 14) strike the extensions 127' of springs 127 and pull the catches 126 out of the respective notches 125 whereupon the springs 129 (Fig. 10) will move the clamps 79' into clamping position. Clamps 79' will remain in this clamping position until the release structure 104 shown in Fig. 14 functions, whereupon the catches 126 of springs 127 will again move into the respective notches 125.

At the time that the turning mechanism D places the slice 61 on the transfer belt 62, said belt is stationary and remains stationary until the clamps 79' have been released by the release mechanism 104. This release mechanism is shown particularly in Figs. 12ª, 14, 17 and 18. This mechanism includes a rock shaft 130, which is mounted in suitable brackets 130' secured to the casing of the printing mechanism. A gear 131 is rigidly secured to shaft 130 near one end and continually meshes with rack 132 whereby the rock shaft 130 will be rocked back and forth as the rack 132 reciprocates. A guide plate 132" acts to hold the rack 132 in continuous engagement with gear 131. Upstanding posts 133 are riveted, welded, or otherwise rigidly secured to rock shaft 130 and carry a release bar 134 which is clamped in place by suitable bolts 135 extending through slots 136. This arrangement allows the bar 134 to be adjusted vertically along the posts 133. Bar 134 at the ends is bent over to form the end members 137, which in turn are bent to form the respective cams 138 which function as shown particularly in Figs. 12 and 12ª for spreading the respective clamps 79' and thereby permitting the catches 126 (Fig. 13) to snap into the respective notches 125. It is of course understood that the cams and other parts hereinafter described will cause rock shaft 130 and associated parts to function in the proper time to release clamps 79' immediately before the turning mechanism swings back to its original vertical position shown in Fig. 14.

The transfer carrier belt 62 (as shown in Figs. 2, 14, 45 and 46) is formed with a pair of chains 274 mounted on comparatively large sprocket wheels 139 and passing over idlers 140 as well as tension sprockets 141. The sprocket wheels are rigidly secured to shaft 142 (Fig. 45) which carries a sprocket wheel 143 (Figs. 2 and 21) over which driving chain 144 moves. Shaft 142 supports one end of the carrier frame 275, while the other end is riveted, bolted, or otherwise secured to a U-shaped support 275 secured at 277 (Fig. 14) to a bracket or other extension carried by the frame 1. Carrier frame 275 supports a rotatable bar carrying the idlers 140. The tension sprockets are vertically adjustable on the uprights of the U-shaped support 276 as shown in Fig. 14. Preferably each link of each of the chains 274 is provided with a pin 278 on which is mounted a roller 279 (Fig. 46). By this arrangement of rollers the slice of butter will not adhere to the transfer or carrier belt 62. As shown in Fig. 20, chain 144 is also held in proper operative position by idler sprockets 145 and 146. The large sprocket wheel (Fig. 21) 147 acts as a power wheel for chain 144 which chain also passes over sprocket wheel 148 secured to shaft 261 (Figs. 2 and 4).

As the transfer or carrier belt 62 functions, the butter is moved between the embossing rolls 150 and 151 (Figs. 21 and 22) which has embossing plates mounted thereon. The respective embossing plates 150' and 151' may, if desired, be removable. These embossing rolls naturally operate in unison but are connected respectively to the shafts 152 and 153 which are supported by suitable journal members mounted on the embossing casing 150". The shafts 152 and 153 carry beveled gears 154 and 155, as shown in Fig. 22. These beveled gears continually mesh with beveled gears 156 and 157 rigidly secured to the vertical shaft 158. Shaft 158 is carried by suitable journals mounted on the respective brackets 159 and 160 secured to casing 150". A beveled gear 161 rigidly secured to shaft 158 continually meshes with the beveled gear 162 which is rigidly secured to shaft 163 carried by the frame 1 and by bracket 164 secured to frame 1. A gear wheel 165 is also rigidly secured to shaft 163, said last mentioned gear wheel continually meshing with the rack 166 which is guided by the rod 167, as shown in Fig. 3ª. A roller 168 extends from one end of the rack 166 into the cam groove 169 of the cam 170 which is rigidly secured to shaft 149, which shaft receives power from the transmission shaft 12 through the gears 19 and 20. Shaft 163 also projects beyond the frame 1 and receives a spool 174 on which is placed the supply 175 (Fig. 1) of wrapping paper used in connection with the wrapping mechanism. The shaft 163, by virtue of rack and pinion 165 and 166, has an oscillatory motion within the paper spool 174, which spool is free to rotate. When the paper is being fed from the reel, the oscillation of the shaft 163 is in the direction of the feed, tending, by virtue of the friction between spool 174 and shaft 163, to drive the reel of paper. By virtue of the same friction on the return oscillatory motion of shaft 163, any slack or overrun of paper will be taken up, thereby maintaining a uniform tension on the paper. A ratchet structure 176 is shown in Fig. 22 and is adapted to have one part rigidly connected with the shaft 163 and the other part connected with the sprocket 147 so that when the rack 166 is moving forward on its power stroke, sprocket wheel 147 will rotate with shaft 163, but when the rack 166 is on its return stroke the ratchet structure will release sprocket wheel 147 so that it will remain stationary, although the embossing rolls will rotate in a reverse direction.

As shown in Fig. 22 means has been provided for adjusting roller 150 toward and from roller 151 to accommodate slices of different thicknesses. Shaft of roller 150 is rotatably mounted in a block 280 which is vertically slidable in casing 150". A headed screw member 281 is threaded through the upper end of casing 150" and the head 282 thereof is rotatably held in place by a retaining plate 283 which may be held in place by screws or other means. Bracket 159 is carried by block 280 and slides on shaft 158. The beveled pinion 156 is slidably splined to shaft 158 and rotatably carried by bracket 159 so that as the block 280 and roller 150 move up and down pinions 156 and 154 will move in unison.

The embossing rolls are preferably heated to a certain extent by the respective electric heaters 177 and 178. Suitable condensers 179 and thermostats 180 are also used to secure a desired uniform temperature. In Figs. 43 and 44 will be seen diagrams showing an arrangement of heaters 177 and 178, condensers 179 and thermostats 180 which are designed to maintain an even temperature at all times. However, it will be understood that any other form of heater and control could be used, as the specific structure of the heater and associated parts form no part of the present invention. It will be understood that the butter is cold and hard as it moves from the transfer or carrier belt 62. The warm embossing plates 150' and 151' press the embossing members into the butter easily by reason of the fact that they are at a temperature comparatively high to the temperature of the butter. The embossing plates are adapted to have projecting members thereon which are really the embossing members and usually consist of a letter, although other configurations could be used. By this arrangement the slice of butter may be embossed on both sides if desired, and then fed forwardly to the cutting mechanism where the large slice 61 is cut into small chips or patties 65. If desired, either of the plates 150' or 151' could be made comparatively smooth, and in that event the butter would be embossed only on one side.

As shown in Figs. 1 and 24, there is provided an auxiliary table 181, which is supplied with a removable rubber or other resilient plate 182 arranged immediately below the cutting knives to give a clear cut edge without cutting the paper. Also from Fig. 24 it will be seen that there is provided a bracket structure 183 for supporting the bar or roller 184 as near the lower embossing roll 151 as possible. Paper from the roll or supply 175 extends around the guide rod or roller 185, which is an adjustably mounted idler, and then around the guiding bar or roller 186 to the guiding bar or roller 184. From this last bar or roller the paper extends in a straight line and in horizontal position toward the wrapping station H. As soon as the slice 61 of butter leaves the embossing rolls the paper moves sufficiently to cause the slice of butter to position itself immediately below the cutting mechanism shown in Figs. 1 and 23. As soon as the butter is immediately below the cutting mechanism the movement thereof stops and then cam 187 (Fig. 20) acts on the roller 188 carried by lever 189 to swing this lever. Lever 189 is pivotally mounted at 190 and pivotally connected at 191 to the vertically movable rod 192 which slidably extends through the table 2 and the base of bracket 193, as shown in Fig. 23. This swings on end of the walking beam structure 194 upwardly and the other end downwardly to force the reciprocating rods 195 downwardly. As rods 195 slide through the guide 196 the cutting mechanism 197 will function. This mechanism includes a casing 198 carrying a heating block 199 to which the various cutters or knives 200 are secured. It will be understood that these knives cross each other, as indicated in Fig. 25, thereby the butter is cut into the desired size chips or patties. Stripping members 201 coact with the knives and act to strip the cut chips from the knives as they move upwardly. Each of the strippers 201 has a hollow stem 201' (Fig. 48) slidingly extending through block 199 and a supporting plate 201". Plate 201" has a supporting screw 202 (Fig. 24) threaded thereon for adjustably supporting the same. Screw 202 has an annular groove 203 which accommodates the fingers 204 which are preferably integral extensions of bracket 205 which is bolted or otherwise rigidly secured to the stationary bracket 193 (Fig. 23). By means of this structure strippers 201 will remain stationary as the knives or cutters 200 and associated parts move. In order to positively prevent the butter sticking or adhering to the strippers, a small tube 284 is fitted in each stem 201' and has one end connected to a supply header 285 (Fig. 47). A hose 286 supplies air or water under pressure to the pipe 287 which in turn supplies the air or water to header 285. A control valve 288 is interposed in pipe 287 to turn on and off the water or air. This may be any kind of valve provided with an arm 289 to turn the same on and off. A bracket 290 is secured to the casing 198 and is provided with a slot 291 into which extends the arm 289. The slot 291 is of a proper length to turn on the water or air substantially as the knives enter the butter and turn off the water or air substantially at the time the knives leave the butter. When the water is used a small layer 292 (Fig. 48) of water will be provided between the stripper and the butter for positively preventing any of the chips of butter adhering to the strippers.

While one cut or slice of butter is moving on to the wrapping table 68 the succeeding slice will be moving beneath the cutting structure, and all of the other parts of the machine will be functioning in the order heretofore described. As soon as the movement of the paper stops the paper cutting knife 207 will function. This knife moves into a slot 208, as shown in Fig. 32, so as to give a shearing action. A paper holding structure 262 (Fig. 1) clamps the paper against the platform 68 during the cutting movement of knife 207 and during its retraction. This mechanism may be of any desired kind with a presser foot 263 carried by the vertically extending arms 264. These arms are carried by a bar 265 secured to the vertically reciprocating rod 266. Rod 266 is guided by bracket 267 secured to the guide 196 of the cutting mechanism. A stop or abutment 268 is rigidly secured to rod 266 and supports a spring 269. A swinging lever 270 actuated by pin 271 carried by rods 195 moves lever 270 to cause the holding structure 262 to function each time the cutting structure (Fig. 23) moves downwardly into functioning position.

The knife 207 (Fig. 26) is riveted or otherwise rigidly secured to a transverse bar 209. This bar has enlarged ends and to the enlarged ends the vertical reciprocating rods 210 are secured. These rods are guided in suitable guiding members 211 forming a part of the bracket 212 (Fig. 37), which bracket is stationary. Each of the guiding members 211 is provided with a slot 213 through which the V-shaped actuating bar 214 extends. The respective ends of the bar 214 extend through the respective slots 213 and are secured rigidly by welding or otherwise to the rods 210 so as to move with these rods. As shown in Fig. 26, the paper cutting knife 207 is formed with teeth 207' so as to make a more positive cutting action when the knife is functioning. At the time that the knife functions the paper 175' is clamped in place so that it can not move.

The paper is pulled along by suitable mechanism shown particularly in Figs. 26 and 32. These clamping and moving structures have duplicate parts on opposite sides of the paper and the description of one set of parts will apply to the other parts. As shown in Figs. 1 and 32, there are three paper pulling mechanisms, but it will be understood that more or less should be used by adjusting the other mechanism accordingly. As shown particularly in Fig. 26, there is provided a transversely extending strip of metal or other material 218 which is always below the paper when functioning. As shown in Fig. 27, brackets 222' are secured to the chains 222 carried by spocket wheels 220 and 223 and the strip 218 is secured to the brackets so as to be moved by the chains. A guide or bearing member 217' is secured to the strip 218 and in turn carries a sliding bar 217 which carries a rubber roller 216 at one end. When the paper is to be pulled forwardly roller 216 is moved over to the dotted position shown in Fig. 27 to clamp the paper against strip 218 whereby when this strip is moved the paper will be moved. A cam 215 is secured to one end of bar 217. Cam 215 is provided with a guiding extension 215' slidingly mounted in groove 251". Cam 215 is also provided with a cam surface 218' and a shoulder 219 against which the end 228 of lever 227 acts. When the cutter 207 (Fig. 26) moves downwardly for a cutting action, rollers 221 secured to bar 209 will also move downwardly and will strike cam surfaces 218' and move cams 215 and associated parts to the right as shown in Fig. 27 until the soft rubber rollers 216 move over to the dotted position for clamping the paper against the strip 218. After the cutter 207 has functioned and been retracted, chains 222 will move a certain distance and will pull the paper until end 228 of lever 227 is in position to strike shoulder 219 and pull cam 215 and associated parts back to the full line position shown in Fig. 27, whereupon the paper will be released. As shown in Figs. 5 and 29, end 226 of lever 227 is formed as a cam adapted to be actuated by roller 225 (Fig. 26) as the bar 209 carrying cutter 207 moves downwardly on its cutting stroke. It will therefore be seen that as one paper pulling structure is moved to clamping position the paper pulling structure ahead is released. As shown in Fig. 5, a retractile spring 227' is connected with pin 227" and with pin 227'" carried by bracket 212. This spring functions to move lever 227 back to its former position ready for a second operation. Lever 227 is pivotally mounted on pin 272 carried by bracket 273 which is bolted or otherwise rigidly connected with the frame 1.

As indicated in Figs. 1 and 37, bar 209 carrying the knife or cutter 207 is actuated by bracket 229 rigidly secured to the casing 198 of the cutting mechanism so that the knife or cutter will function substantially simultaneously with the cutting mechanism.

Immediately after the sheet 175' has been cut from the paper supply 175 by knife 207, the wrapping mechanism begins to function. This mechanism is shown more particularly in Figs. 32 to 37 inclusive. From these figures it will be seen that there are provided a number of adjustable folding fingers 230 and also a number of adjustable folding fingers 231 which may be adjusted to accommodate varying thicknesses of butter slice 61. As indicated in Fig. 2, the plate or table 68 is provided with any desired number of slots 232. These slots are arranged to accommodate the various fingers 230 and 231 and there is provided a finger for each slot. When the butter first moves into position, as shown in Fig. 32, the fingers are in their lowermost position. As the machine continues to function, the various fingers 230 will swing upwardly to the position shown in Fig. 33. This movement folds one end of the paper over the butter, and as this action is about completed finger 231 will begin to function and fold the other end, as illustrated in Fig. 33. When the fingers have moved the paper to the finished position shown in Fig. 34, they are reversed in their movement and brought back to the position shown in Fig. 32, after which the pusher bar 233 pushes the wrapped butter off of the table 68 on to platform 66. The pushers 233 are connected with chain 222 and are moved thereby. In the drawings there are provided three pusher bars 233 and they naturally come up beneath the paper, as illustrated in Figs. 32 and 33. By this arrangement, when the fingers 231 fold one end of a severed piece of paper over the butter, the adjacent pusher bar 233 will be clear of the wrapped butter but will move the wrapped butter along as the chain 222 continues to move. As shown in Figs. 39 and 50, the pusher bars 233 are rectangular in cross section and are freely rotatable on the brackets 233' secured to the chains 222. At one end each bar 233 is provided with a weight 293 extending upwardly therefrom and at the opposite end with a cam or shoe 294 which functions to turn the bar 233 into a vertical position when the shoe strikes the guide rail 295, as shown in Fig. 50. After leaving the guide rail the shoe 294 and pusher bar 233 swing downwardly as shown in Fig. 37, under the action of weight 293.

In order that the fingers just described may move as set forth, they are secured to suitable clamping blocks 234 and 235, and these blocks are secured to shafts 236 and 237. A pinion 238 (Figs. 5 and 37) is secured to shaft 236 while a similar pinion 239 is secured to shaft 237. These pinions are in continuous mesh with the respective racks 240 and 241. These racks extend through suitable apertures in the brackets 242 and 243 so as to be guided thereby. Rollers 244 and 245 are mounted respectively on the ends of the racks 240 and 241. A cam 246 is normally positioned beneath the rollers just described, and when caused to function will separate these rollers so that the pinions 238 and 239 will function. The cam 246 is shown more in detail in Figs. 35 and 36, from which it will be seen that the cam 246 is provided with a cam surface 247 coacting with roller 244 and cam surface 248 coacting with roller 245. It will be noted that the surface 248 is longer than surface 247. This causes the shaft 236 to swing more rapidly and to complete its movement before the fingers 231. The rollers 244 and 245 are in the same horizontal plane so that after the surface 247 has functioned roller 244 will contact with the vertical surface 249 and thereby remain stationary while cam 246 continues to move upwardly and cause a further movement of the fingers 231. Eventually cam 246 moves to the position shown in Fig. 36 and then to a position above the rollers.

From Fig. 5 it will be seen that there are provided springs 250 and 251 connected to the respective stationary bars 252 and to the racks 240 and 241. By reason of this construction, as soon as the cam 246 moves above the rollers the springs will begin to function and will quickly move the parts back to the position shown in Figs. 32 and 37. Shortly after this has been accomplished the knife 207 and associated parts will function, whereupon the bar 209 and rods 210 shown in Figs. 26 and 27 will move downwardly. A substantially U-shaped bracket 214 is rigidly secured to these rods and functions to move cam 246 (Fig. 37). When the knife is elevated, cam 246 will be elevated, and later when the knife is lowered, cam 246 will be lowered.

Referring to Figs. 30, 31 and 37, it will be seen that the cam 246 is connected with a supporting bar 253 pivotally mounted at 254 on the bracket 255 secured to the center of the bracket 214. Bracket 255, as shown in Fig. 31, is provided with a notch 256 in which the pivoted end of bar 253 is disposed when the cam 246 is in its normal vertical position. A pin 257 extends from the cam 246 and is normally pulled by the retractile spring 258 which is secured at its lower end to a pin 259 carried by the bracket 255. This causes the cam to remain vertical as it moves upwardly, but when it moves downwardly the curved surface 260 of cam 246 will strike the rollers 244 and 245 (Fig. 37) and be deflected laterally, as indicated in dotted lines in Fig. 30. Cam 246 and associated parts continue their downward movement until the cam passes the rollers, whereupon spring 258 will cause the parts to snap back into the position shown in Fig. 31 ready for another actuation.

As shown in Fig. 39, the various pushers or push rods 233 are provided with a pair of brackets 233' at each end and these brackets at the lower part are welded or otherwise secured to certain links of the respective chains 222. It will also be noted that the respective chains 222 are actuated by the sprocket wheels 223 which are rigidly secured to shaft 261 which in turn is actuated by the sprocket wheel 148 moved by the chain 144.

Referring again to Figs. 17 and 20, it will be observed that the rack 132 is actuated by cam 132' simultaneously with the actuation of the cam 187 which moves the lever 189 and associated parts. This will cause all the parts to function in proper time relation.

From Figs. 1, 11 and 20 it will be observed that power is taken off of drive shaft 12 and transmitted through gears 19 and 20 to shaft 149. This shaft, as shown in Fig. 11, drives sprocket wheel 187'', which in turn drives chain 187'''. Chain 187'''' drives sprocket 187', which in turn drives shaft 188' so that rack 132 and associated parts may function in time with the other mechanism.

I claim:

1. A machine for cutting butter and similar plastic material into small blocks and embossing a legend on each block, including a loading structure for receiving the butter to be cut and moving the same a predetermined distance, a feeding belt for receiving the butter from said loading structure, a slicing mechanism for slicing said butter as it leaves the end of the travel of said feeding belt, means for successively moving the respective sliced butter into an advanced position, embossing means, means for moving the sliced butter from its advanced position into functioning engagement with said embossing means, a cutting mechanism for cutting the embossed butter into small blocks after leaving the embossing means, means for receiving and wrapping the cut butter, and means for ejecting the wrapped butter.

2. A machine adapted to receive a supply of butter and cut and wrap the same into chips, including a feeding mechanism for feeding the supply of butter to a given point, means for successively slicing the supply of butter, a pair of embossing rollers, means for directing the butter immediately after it has been sliced between said embossing rollers so as to receive impressions therefrom, said embossing rollers acting also as means for moving the sliced butter forwardly, means including wrapping paper for moving the embossed butter to a point beyond the embossing rollers, cutting mechanism for cutting the embossed butter into small blocks, means for moving the cut butter away from the cutting mechanism, means for wrapping paper around the cut butter, and means for ejecting the wrapped butter, the various elements set forth operating in time relation.

3. In a butter cutting and embossing machine, means for slicing butter into slices of desired thickness, means for embossing on each slice of butter legends in spaced relation, said means acting also to feed the sliced butter forwardly, and means for cutting the embossed butter so that a legend will be arranged substantially centrally of each cut block.

4. In a butter cutting machine of the character described, a butter slicing mechanism, a feed mechanism, means for actuating said feed mechanism for feeding a supply of butter to said slicing mechanism, means functioning immediately after each slicing operation to turn the sliced part of the butter to an advanced position, means for moving the turned slice of butter to a forward position, and embossing means for embossing the butter after it has been moved to said forward position, and operating means for cutting the embossed butter into small blocks with the embossed legends central of each block.

5. In a butter cutting machine adapted to receive butter and cut the same into small blocks, a slicing mechanism for slicing a supply of butter into slices, said slicing mechanism including a cutting member, an arm for causing said member to function, a reciprocating member for causing said arm to move up and down, and a continuously rotating cam for causing the arm to quickly move downwardly and then upwardly during the slicing operation and then dwell for a predetermined time, means for moving the slice of butter to a horizontal position, and successively operating means for embossing the slice of butter and then cutting the same into chips.

6. In a machine of the character described, the combination of a frame mounted for vertical reciprocatory movement, a butter slicer carried by said frame adapted to slice butter upon the movement of said frame, mechanism for reciprocating said frame which will cause a dwell after each cutting movement, means for guiding said frame in its movement, and a butter clamping mechanism carried by said guiding means for clamping said butter during the slicing operation.

7. In a machine of the class described, a clamping and turning mechanism comprising a pair of resilient clamps, arms for carrying said clamps, means for swinging said arms from a vertical to a horizontal position, and means for moving said arms and clamps radially in respect to the pivotal point of said arms during the swinging movement thereof.

8. In a machine of the character described, a rock shaft, means for causing said rock shaft to function intermittently, a pair of posts extending radially from said rock shaft, an arm slidably mounted on each of said posts adapted to slide longitudinally of the posts, a clamp carried by each of said arms, a cam for sliding said arms longitudinally of said clamps, means for moving said clamps to an inoperative position upon the completion of the movement of said rock shaft to one extreme position, and means for locking said clamps in said inoperative position.

9. In a machine of the character described, means for slicing a block of butter, gripping and turning means for taking the slices of butter individually immediately after cutting and turning them to a horizontal plane, releasing means for releasing each slice substantially as it reaches the horizontal, said releasing means including a rock shaft, a pair of posts connected to and extending radially of said shaft, means for rocking said shaft and swinging said post to a horizontal position and then back to a vertical position, and a releasing bar carried by said posts positioned to engage and release said gripping means immediately after the gripping means has reached a horizontal position.

10. In a machine of the class described, a cutting mechanism for cutting into small blocks a slice of butter, said mechanism including a plurality of cutters, means for stripping the cut butter from said cutters when the cutters are withdrawn from the butter, a heating structure for heating said means whereby said means will not adhere to said cut butter, means for causing said cutters to enter and cut through said slice of butter and then be withdrawn therefrom, and means coacting with the cutter actuating means for preventing said stripping means from adhering to said butter after the cutters have been withdrawn from the butter.

11. In a machine of the class described, a slicer for slicing material into slices, means for removing the sliced material immediately after each slicing operation, an embossing mechanism, means for moving said removed sliced material into said embossing mechanism, means for causing said embossing mechanism to function, a cutting mechanism positioned to receive the embossed slice after each function of the embossing mechanism, said cutting mechanism being provided with a plurality of cutting members for cutting said embossed slice into chips, means for stripping said chips from said cutting members, and means for supplying a layer of fluid between said chips and the strippers for preventing the chips adhering to the strippers.

12. In a butter cutting machine, means for slicing a supply of butter into slices, means for embossing said slices successively, means for cutting the embossed slices into chips, said cutting means including cutting members adapted to move to perform a cutting operation and then move to a retracted position, a platform for supporting the sliced butter during the cutting operation, and a resilient structure carried by said platform below said cutting members.

13. In a machine for cutting butter into chips, a cutting mechanism adapted to receive a slice of butter, said mechanism being formed with a plurality of cutting members for cutting the slice of butter into chips, means for stripping said chips from said cutting members, and means for supplying a layer of fluid between said chips and said stripping means for preventing the chips adhering to said stripping means.

14. In a machine for cutting butter into chips, a cutting mechanism including a plurality of cutting members, means for maintaining said members heated, a plurality of strippers, and means for supplying a layer of water between said strippers and the cut butter.

15. In a machine for cutting butter into chips, a cutting mechanism adapted to receive a slice of butter to be cut, said mechanism including cutting members for cutting said slice of butter into chips, means for causing said cutting members to pass through the butter, a heat reservoir secured to said cutting members for maintaining said cutting members warm, electric heating means for supplying heat to said reservoir, stripping means for stripping the chips from said cutting members, and means inserted between the stripping means and the butter for preventing said stripping means from adhering to said butter after the cutting members have been disengaged.

16. In a machine for cutting butter into chips, a cutting mechanism adapted to receive a slice of butter, said mechanism being formed with a plurality of cutting members for cutting the slice of butter into chips, means for stripping the chips from said cutting members, and mechanism for supplying means between said chips and said stripping means for preventing the chips adhering to said stripping means.

17. In a butter cutting and embossing machine, means for slicing butter into slices of desired thickness, an embossing roller for embossing on each slice of butter legends in spaced relation, means coacting with said embossing roller functioning to feed the sliced butter forwardly, and means for cutting the embossed butter into blocks so that a legend will be arranged substantially centrally of each cut block.

BENJAMIN ROTTENBERG.